(12) United States Patent
Mackin et al.

(10) Patent No.: US 9,644,605 B2
(45) Date of Patent: May 9, 2017

(54) SYSTEMS, METHODS, AND APPARATUS FOR A FLOW CONTROL DEVICE FOR AN EMERGENCY POWER GENERATOR

(71) Applicant: The Boeing Company, Chicago, IL (US)

(72) Inventors: Steve G. Mackin, Bellevue, WA (US); Austin J. Snider, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/007,089

(22) Filed: Jan. 26, 2016

(65) Prior Publication Data

US 2016/0160841 A1     Jun. 9, 2016

Related U.S. Application Data

(63) Continuation-in-part of application No. 14/044,463, filed on Oct. 2, 2013, now Pat. No. 9,452,721.

(51) Int. Cl.
| | |
|---|---|
| *F03D 5/02* | (2006.01) |
| *F03B 9/00* | (2006.01) |
| *F03D 9/32* | (2016.01) |
| *B60R 16/03* | (2006.01) |

(52) U.S. Cl.
CPC ............ *F03D 5/02* (2013.01); *F03B 9/005* (2013.01); *F03D 9/32* (2016.05); *F05B 2220/10* (2013.01); *F05B 2240/923* (2013.01); *Y02E 10/20* (2013.01); *Y02E 10/70* (2013.01); *Y02E 10/728* (2013.01)

(58) Field of Classification Search
CPC .................................................... B60R 16/03
USPC .................................................. 307/10.1, 153
See application file for complete search history.

(56) References Cited

U.S. PATENT DOCUMENTS

| | | | |
|---|---|---|---|
| 3,887,817 | A | 6/1975 | Steelman |
| 9,452,721 | B2 | 9/2016 | Mackin |
| 2003/0066934 | A1 | 4/2003 | Bolonkin |
| 2008/0303285 | A1 | 12/2008 | Bondhus |
| 2015/0091375 | A1 | 4/2015 | Mackin |

FOREIGN PATENT DOCUMENTS

| | | |
|---|---|---|
| DE | 21614 C | 3/1883 |
| DE | 25332 C | 1/1884 |
| EP | 1878916 A1 | 1/2008 |

(Continued)

OTHER PUBLICATIONS

"U.S. Appl. No. 14/044,463, Non Final Office Action mailed Feb. 8, 2016", 7 pgs.

(Continued)

*Primary Examiner* — Robert Deberadinis
(74) *Attorney, Agent, or Firm* — Kwan & Olynick LLP

(57) ABSTRACT

Systems, methods, and apparatus are disclosed for generating power for a vehicle. Apparatus may include a power generator configured to generate power based on one or more aerodynamic forces associated with a vehicle. The power generator may be further configured to be deployed from a first portion of the vehicle. The apparatus may also include a flow control device configured to generate an increase in airflow associated with the power generator. The increase in airflow enables, at least in part, the generation of additional power by the power generator. The flow control device may be further configured to be deployed from a second portion of the vehicle.

20 Claims, 15 Drawing Sheets

(56) References Cited

FOREIGN PATENT DOCUMENTS

| FR | 2736101 A1 | 1/1997 |
|----|------------|--------|
| FR | 2970525 A1 | 7/2012 |
| WO | 2012067533 A1 | 5/2012 |

OTHER PUBLICATIONS

"U.S. Appl. No. 14/044,463, Notice of Allowance mailed Jun. 9, 2016", 5 pgs.
"European Application Serial No. 14187318.2, Search Report mailed Feb. 19, 2015", 6 pgs.

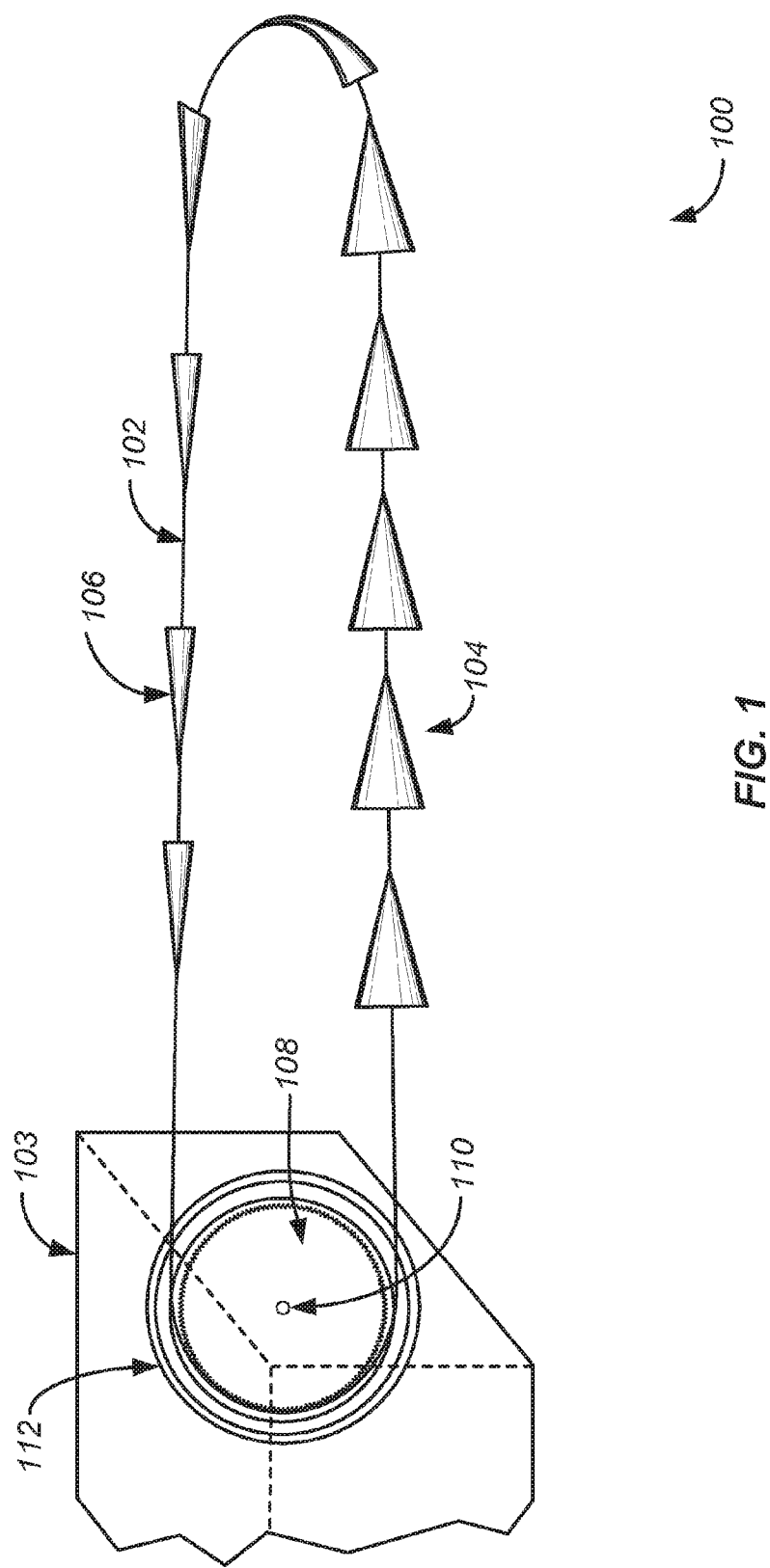

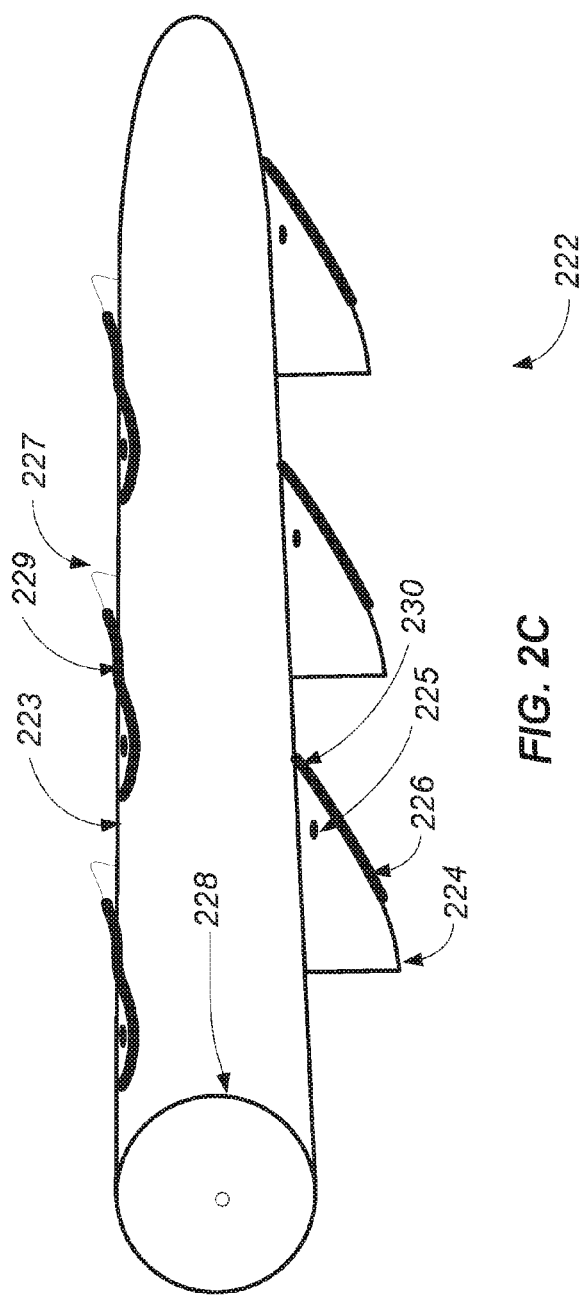
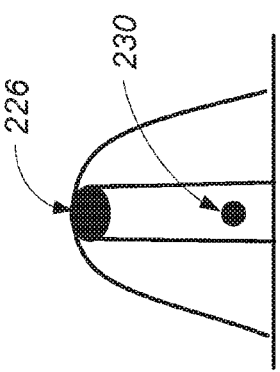
FIG. 2C
FIG. 2D

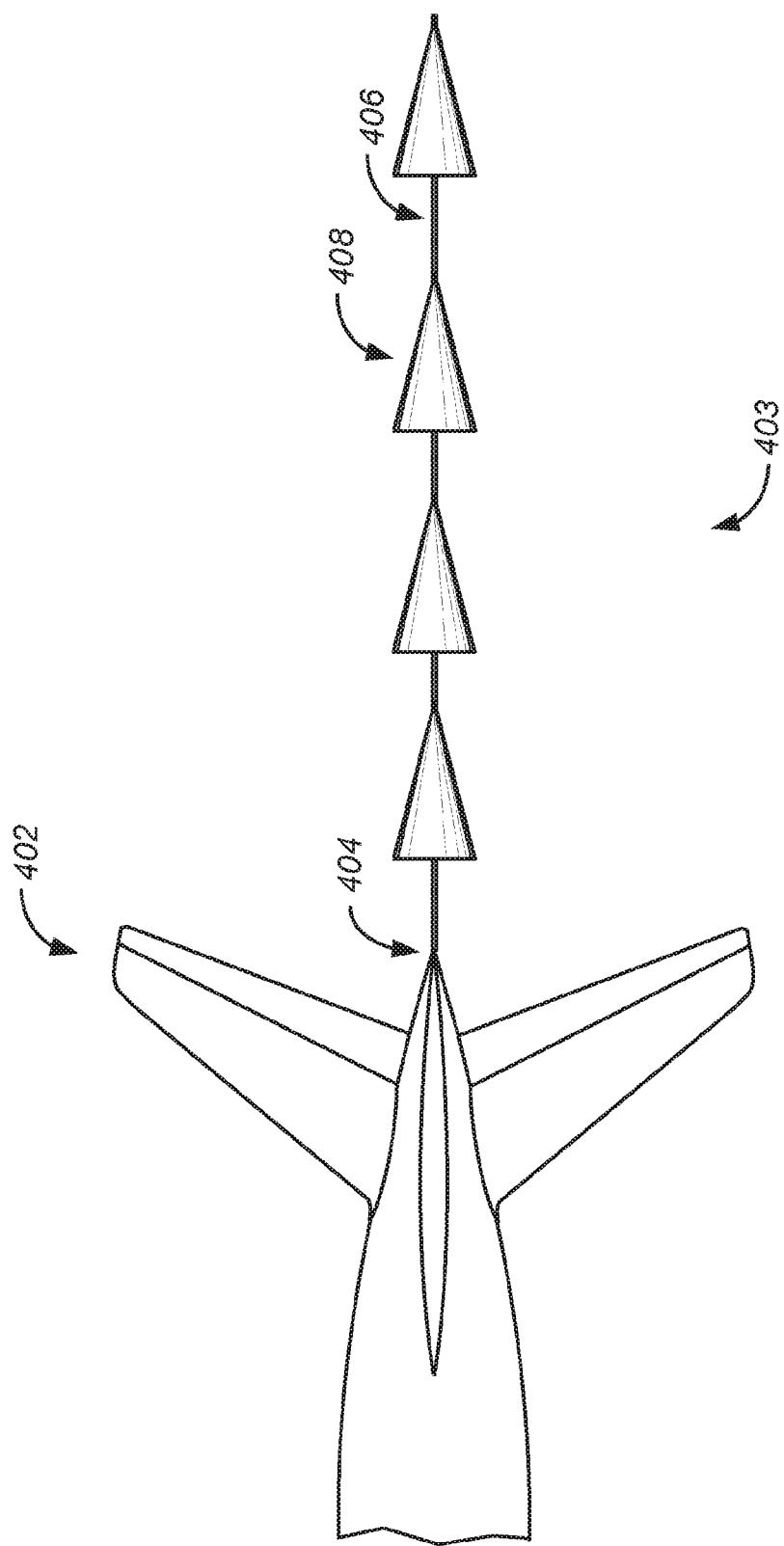

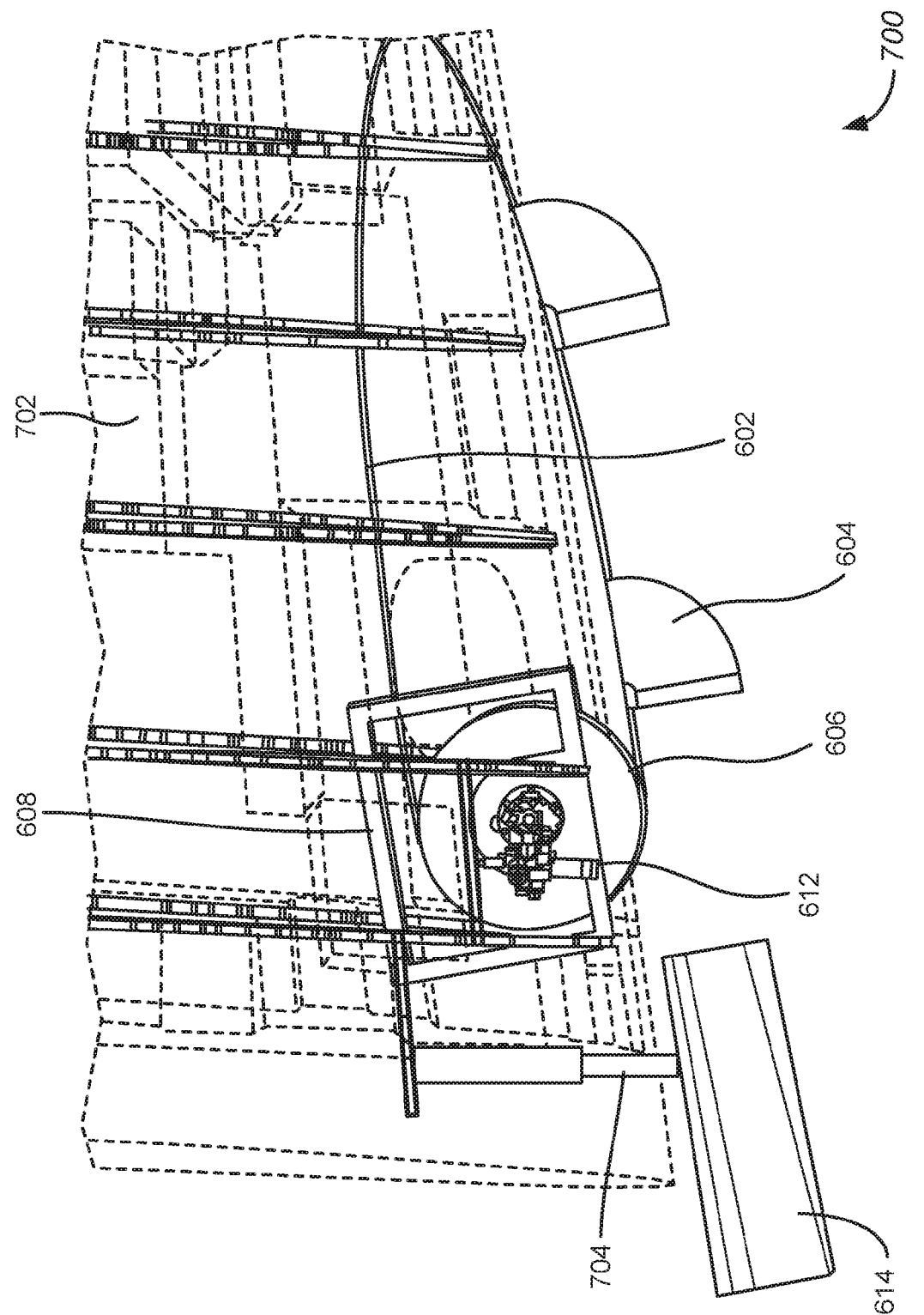

SYSTEMS, METHODS, AND APPARATUS FOR A FLOW CONTROL DEVICE FOR AN EMERGENCY POWER GENERATOR

CROSS-REFERENCE TO RELATED APPLICATIONS

This application is a continuation-in-part of U.S. application Ser. No. 14/044,463, filed Oct. 2, 2013, which is incorporated by reference herein in its entirety.

TECHNICAL FIELD

This disclosure generally relates to vehicles and machinery and, more specifically, to power generators associated with vehicles.

BACKGROUND

In operation, a vehicle, such as an airplane, may experience a situation or condition that results in a loss of power. The loss may be of electrical power or hydraulic power. When such a loss occurs, an emergency power generator may be deployed to generate additional power. Conventional air turbines may be deployed from a fuselage section of the vehicle and may use an airstream or flow of air past the vehicle to generate power for some systems of the vehicle. However, due to the geometry and design of the air turbine, the size of the air turbine must be within certain limits. More specifically, the size of the turbine is limited based on various factors, such as installation constraints, a vehicle geometry, weight, and landing gear height. For example, the size of the air turbine cannot be too large or too heavy to be coupled with or stored in the vehicle. Thus, the size of the air turbine is limited by various vehicle dependent parameters, such as installation constraints, payload capabilities, and landing gear height. Because the size of the ram air turbine is limited by vehicle parameters, such as ground clearance and landing gear height, the power generated by the turbine remains limited. As vehicles and airplane develop more intricate, complicated, and developed electrical and hydraulic systems, their power needs will increase. Furthermore, conventional ram air turbines require a strut for support. The strut may be a heavy component that increases the weight associated with the ram air turbine. Moreover, once the turbine is deployed it cannot be retracted. Further still, a ram air turbine might not generate power that is instantly available because it requires time to spin up.

SUMMARY

Provided are one or more power generators that may be used to generate power for one or more vehicles. The power generators disclosed herein may be deployed from a vehicle to generate additional power for the vehicle. The power generator may include a loop of resistive devices that may be deployed from a portion of the vehicle. One or more parameters of the resistive devices as well as the location from which they are deployed may be configured to obtain a high power to weight ratio sufficient to meet the vehicle's power needs. Also disclosed herein are flow control devices that may be implemented with the power generators to modify or adjust airflows associated with the power generators.

Thus, according to some embodiments, an apparatus for generating power is disclosed. Apparatus may include a power generator configured to generate power based on one or more aerodynamic forces associated with a vehicle. The power generator may be further configured to be deployed from a first portion of the vehicle. The apparatus may also include a flow control device configured to generate an increase in airflow associated with the power generator. The increase in airflow enables, at least in part, the generation of additional power by the power generator. The flow control device may be further configured to be deployed from a second portion of the vehicle.

In some embodiments, the power generator is further configured to be deployed in response to a first event, and the flow control device is configured to be deployed in response to a second event. In various embodiments, the second event comprises a speed of the vehicle being less than a first designated threshold value. According to various embodiments, the flow control device has an input configured to receive an input airflow, and has an output configured to generate an output airflow In some embodiments, a first speed of the input airflow is less than a second speed of the output airflow. In various embodiments, the power generator includes a loop, a plurality of resistive devices coupled to the loop. According to various embodiments, at least one of the plurality of resistive devices is configured to transfer a force to the loop, where the force is generated based on an aerodynamic drag associated with the at least one resistive device. The power generator may also include a pulley coupled to the loop and the generator, where the pulley is configured to receive the force transferred to the loop. In some embodiments, the pulley is further configured to rotate in response to receiving the force from the loop, and the pulley is further configured to transfer the force to the generator. The power generator may also include a generator coupled to the loop and an electrical system, where the generator is further configured to deliver power to the electrical system in response to the loop rotating.

In various embodiments, the flow control device is a nozzle, and the flow control device is configured to provide the output airflow to at least one of the plurality of resistive devices responsive to being in a deployed position. According to various embodiments, each resistive device of the plurality of resistive devices is a pocket coupled to the loop. In some embodiments, the first event includes the identifying of a power level associated with the vehicle being less than a second designated threshold value. In various embodiments, the flow control device and the power generator are configured to be deployed at different times. According to various embodiments, each resistive device of the plurality of resistive devices is a parachute. In some embodiments, the power generator is located along a centerline of the vehicle, and wherein the vehicle is an airplane.

Also disclosed herein are methods that may include deploying a power generator in response to identifying a first event, where the power generator is deployed from a first portion of a vehicle. The methods may also include deploying a flow control device in response to identifying a second event, where the flow control device is deployed from a second portion of the vehicle. The methods may further include increasing, using the flow control device, an airflow associated with the power generator, where the increasing of the airflow enables the generation of additional power by the power generator.

In some embodiments, the methods further include generating a first amount of power in response to the deploying of the power generator, and generating a second amount of power in response to the deploying of the flow control device. In various embodiments, the second amount of power is greater than the first amount of power. According to various embodiments, the first event includes the identifying of power level associated with the vehicle being less than a second designated threshold value, and the second event includes a speed of the vehicle being less than a first designated threshold value. In some embodiments, each resistive device of the plurality of resistive devices is a pocket coupled to a loop.

Also disclosed herein are systems that may include a power generator configured to be deployed from a first portion of a vehicle in response to a first event. In some embodiments, the power generator may include a loop, a plurality of resistive devices coupled to the loop, where at least one of the plurality of resistive devices is configured to transfer a force to the loop. In some embodiments, the force may be generated based on an aerodynamic drag associated with the at least one resistive device. In various embodiments, the power generator may also include a generator coupled to the loop and an electrical system, where the generator is further configured to deliver power to the electrical system in response to the loop rotating. The systems may also include a flow control device configured to generate an increase in airflow associated with the power generator. According to various embodiments, the increase in airflow enables, at least in part, the generation of additional power by the power generator, and the flow control device is further configured to be deployed from a second portion of the vehicle in response to a second event.

In some embodiments, the second event includes a speed of the vehicle being less than a first designated threshold value. In various embodiments, the flow control device has an input configured to receive an input airflow, and has an output configured to generate an output airflow, where a first speed of the input airflow is less than a second speed of the output airflow. According to various embodiments, the flow control device is a nozzle, and the flow control device is configured to provide the output airflow to at least one of the plurality of resistive devices responsive to being in a deployed position. In some embodiments, the first event includes the identifying of a power level associated with the vehicle being less than a second designated threshold value. In various embodiments, the power generator is located along a centerline of the vehicle, and the vehicle is an airplane.

BRIEF DESCRIPTION OF THE DRAWINGS

FIG. 1 illustrates an example of a power generator that may be deployed from a vehicle, in accordance with some embodiments.

FIG. 2C illustrates an additional example of a power generator that may be deployed from a vehicle, in accordance with some embodiments.

FIG. 2D illustrates a front view of an example of a resistive device, in accordance with some embodiments.

FIG. 4B illustrates a top view of a vehicle that has deployed a power generator, in accordance with some embodiments.

FIG. 7B illustrates an example of a power generator with a flow control device deployed, configured in accordance with some embodiments.

DETAILED DESCRIPTION

Figure 2A:
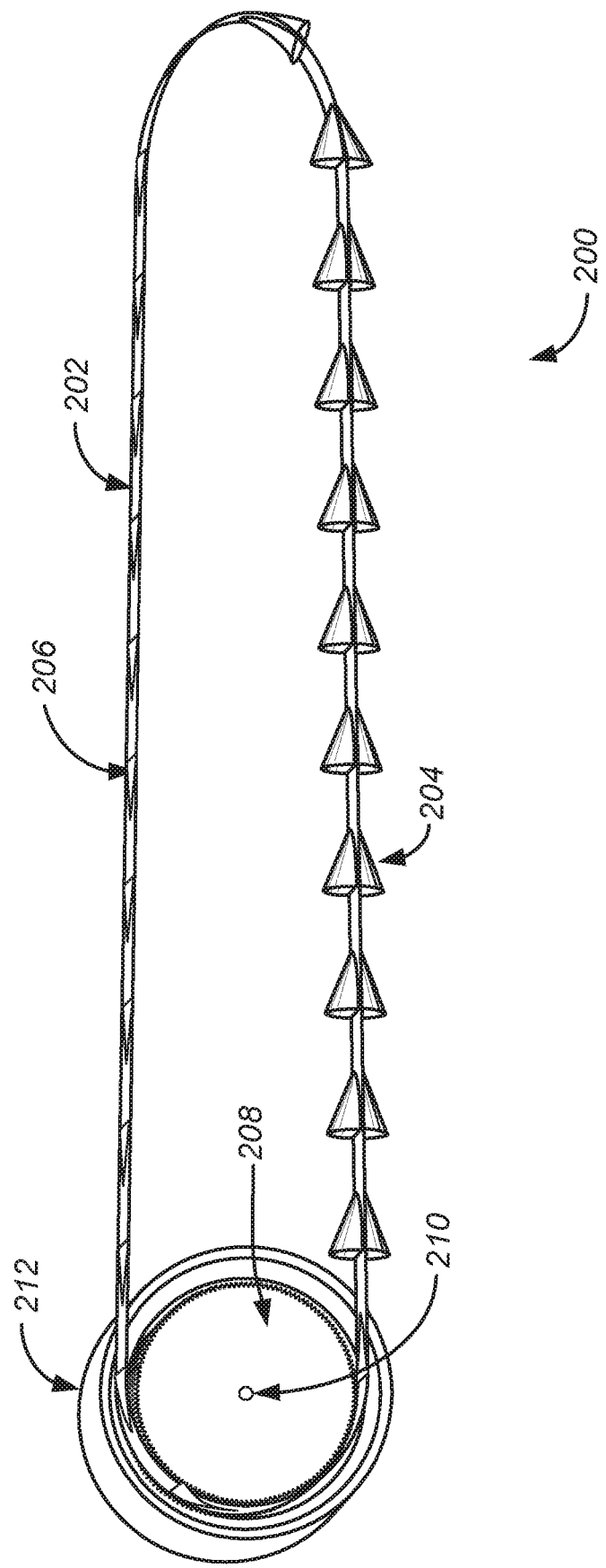
FIG. 2A illustrates another example of a power generator that may be deployed from a vehicle, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Various embodiments disclosed herein are capable of generating power while not being limited by these constraints. In various embodiments, several resistive devices, which may be chutes or pockets, may be coupled to a loop that is deployed from a portion of a vehicle, such as an empennage section of an airplane. The loop may be coupled to a pulley and shaft, which may be coupled to an electrical generator or hydraulic pump. In operation, the loop may be deployed into an airstream flowing by the vehicle. The resistive devices may cause the loop to rotate, as well as the pulley and shaft. The generator may convert the rotation of the shaft to power, thus generating power for the vehicle. In this way, resistive devices, such as drag chutes, may be utilized to spin a shaft attached to a generator or hydraulic pump and generate power for the vehicle. The size and number of the resistive devices may be determined based on an amount of power to be generated.

The embodiments disclosed herein may have a significantly higher power to weight ratio than conventional methods which use a rain air turbine. Various embodiments disclosed herein do not require a strut. Furthermore, systems and apparatus disclosed herein may be installed in more locations on the vehicle, which may be an airplane. Additionally, various embodiments disclosed herein may be configured to provide reverse thrust capabilities. Multiple chute loops may be utilized to generate different amounts of power/thrust reverse. Furthermore, a loop may be cut loose if accidentally deployed or if emergency power is no longer needed.

Embodiments, as disclosed herein may be implemented and used in a variety of operational environments. More specifically, within a particular vehicle, such as an airplane, power generators may be implemented and used to generate emergency power at various different speeds of operation, and consequently have various power generation characteristics and tolerances at each respective speed. For example, at a greater speed, a power generator may be more able to generate power. Due to increased frictional forces between the resistive devices and the passing air, smaller resistive devices may be desirable. However, such smaller resistive devices may not be as effective at generating power at lower speeds. More specifically, at a lower speed, it may be more difficult for a power generator to generate power because less force is generated by the passing air. While, larger resistive devices may be used to generate sufficient power at relatively lower speeds, such larger resistive devices may cause an associated increase in the frictional forces between the resistive devices and the passing air. Accordingly, a particular size or geometry of a resistive device may be suited for a high operational speed or a low operational speed, but might not be equally effective at both operational speeds.

Accordingly, various embodiments as disclosed herein may also include a flow control device that may be independently deployable from other components of the power generator. As will be discussed in greater detail below, the flow control device may be configured to increase airflow received by a power generator, and consequently increase a power generated by a power generator. Accordingly, the deployment of the flow control device may facilitate the use of the power generator and production of emergency power at relatively low airspeeds, and while utilizing relatively compact and efficient resistive devices. In this way, emergency power may be generated efficiently and effectively at both high and low airspeeds. Moreover, power generated by power generators disclosed herein may be almost immediately available because torque utilized to generate the power is instantly available, as opposed to conventional techniques which require a period of time to spin up. Further still, power generators as disclosed herein may achieve significant weight savings, such as between about 50-200 lbs, when compared to conventional power generators.

FIG. 1 illustrates an example of a power generator that may be deployed from a vehicle, in accordance with some embodiments. As previously discussed, a vehicle such as an airplane may experience a loss of power or other situation in which additional power is needed to meet the power needs of the vehicle. In such a situation, one or more components of a power generation apparatus or system, such as power generator 100, may be deployed. In this way, power generator 100 may convert one or more forces into power or electrical energy. The one or more forces may be generated by or result from the motion of the vehicle. For example, the force may be a frictional force or drag generated by air that the vehicle is passing through. Power generator 100 may include a plurality of resistive devices and other components that are configured to convert the force into electrical energy that may be used by the vehicle.

Accordingly, power generator 100 may include loop 102 which may be a loop of material capable of being deployed from the vehicle that houses power generator 100. Thus, loop 102 may include a material that is flexible, compressible, and/or packable to enable loop 102 to be stored in storage compartment 103 of the vehicle when loop 102 is not deployed. The loop of material that includes loop 102 may be configured to have a particular length and width. A length of loop 102 may be determined based on a desired power output and a number of resistive devices that are coupled to loop 102 to obtain the desired power output, as discussed in greater detail below. A width of loop 102 may be selected such that sufficient material is present to enable coupling of loop 102 to the plurality of resistive devices. Thus, loop 102 may be wide enough to enable a fastening device to couple a resistive device, such as resistive device 104, to loop 102. As previously mentioned, loop 102 may be stored in storage compartment 103 when not in use. When loop 102 is deployed, as shown in FIG. 1, one or more external doors of storage compartment 103 may open and the entirety of loop 102 may unfurl and be configured to rotate as a fully extended loop. Loop 102 may be configured to be deployed automatically or in response to a user input. For example, one or more computer systems of the vehicle may detect or identify a condition, such as a loss of electrical or hydraulic power in one or more of the vehicle's systems. In response to detecting the condition, the external doors of storage compartment 103 may be opened, and loop 102 may be deployed. It will be appreciated, that while FIG. 1 illustrates loop 102 configured to rotate in a first direction, such as a counter-clockwise direction, loop 102 may also be configured to rotate in a second direction, such as a clockwise direction.

As previously mentioned, loop 102 may include or be coupled to a plurality of resistive devices, such as resistive device 104 and resistive device 106. A resistive device may be a device configured to create or generate a resistance to a medium through which the vehicle is traveling or passing through. For example, an airplane may be passing through air. Accordingly, the resistive device may be a parachute, such as a drag chute, that resists a flow of the air by the airplane. In various embodiments, the resistive device may be made of or may comprise a material such as canvas, silk, nylon, Kevlar®, and Terylene. Materials such as silk may exhibit superior strength, lightness, thinness, and fire-resistance. Nylon also has the benefit of being resistant to mildew, and has good elasticity. Furthermore, Kevlar® and Terylene are synthetic fabrics that may provide increased strength and heat resistance. Loop 102 may be coupled to a plurality of resistive devices. Thus, returning to the previous example, a plurality of parachutes may be coupled to loop 102 and be configured to generate a resistance to the air through which the vehicle is passing.

In various embodiments, the plurality of resistive devices is capable of being configured in a first configuration and a second configuration. A resistive device may toggle between the first configuration and the second configuration based on a position of the resistive device on loop 102 relative to a flow of the medium through which the vehicle is passing. When in the first configuration, a resistive device may be configured to generate a resistive or drag force based on the flow of a medium past the vehicle. When in the second configuration, a resistive device may be configured to generate significantly less force and/or resistance to the flow of the medium past the vehicle. As shown in FIG. 1, the plurality of resistive devices may be parachutes or drag chutes. When the apex of the resistive device, which may be a chute, is coupled to loop 102 such that the apex points away from the vehicle and in a direction that is the same direction as a flow of the medium through which the vehicle travels, the resistive device may be in the first configuration. Alternatively, when the apex of the resistive device is coupled to loop 102 such that the apex is pointed towards the vehicle and against the flow of the medium, the resistive device may be in the second configuration.

Accordingly, resistive device 104 may be a resistive device that is configured in the first configuration. In this instance, resistive device 104 is a parachute that is deployed and is configured to resist the flow of the air through which an airplane is traveling. Thus, an apex of resistive device 104 may be coupled to loop 102 via a fastening device, which may be one or more staples or stitches. The lower rim of the parachute of resistive device 104 may be coupled to loop 102 via a line or wire, thus restricting the extent to which the parachute can open. Resistive device 106 may be a resistive device that is configured in the second configuration. In this instance, resistive device 106 is a parachute that has the same dimensions as resistive device 104. However, resistive device 106 is not open, and is collapsed. Thus, when in the second configuration, resistive device 106 is not open and does not generate a significant resistive force or otherwise offer much resistance to a flow of air past the airplane. In operation, each resistive device of the plurality of resistive devices may toggle between the first configuration and the second configuration as loop 102 rotates, thus generating and transferring a rotational force to loop 102 in one rotational direction. Various configurations of resistive devices are disclosed herein with reference to FIG. 1, and discussed in greater detail below with reference to FIG. 2A through FIG. 2D.

In various embodiments, the open diameter of the parachute may be determined based on an amount of power that is to be generated by power generator 100. For example, resistive device 104 may be 48 inches in diameter when deployed in the first configuration that is configured to generate a resistive force. In this example, resistive device 104, as well as other resistive devices coupled to loop 102, may collectively generate 1000 pounds of force if the vehicle is traveling at 500 feet per second, or approximately 341 miles per hour. The resistive force generated by the plurality or resistive devices may cause loop 102 to rotate at 350 rotations per minute and cause generator 112 to generate a power output of 80 horse power or 60 kilowatts.

In some embodiments, power generator 100 may further include pulley 108 and shaft 110. Pulley 108 may be a wheel that is mechanically coupled to loop 102 and configured to be rotated based on a rotation of loop 102. Thus, pulley 108 may be a wheel that is 2 feet in diameter and is configured to rotate at between 200 to 500 rotations per minute in operation. In some embodiments, pulley 108 may be configured to include a groove in which loop 102 makes contact with pulley 108. A mechanical force generated by a contact area between loop 102 and pulley 108 may be sufficient to rotate pulley 108. Alternatively, one or more portions of loop 102 may have holes or perforations that fit on top of one or more pegs or ratchets of pulley 108. In this way, loop 102 may be coupled to pulley 108 such that a rotation of loop 102 is transferred to pulley 108. Accordingly, when the plurality of resistive devices generates a resistive force and transfers the resistive force to loop 102 and causes loop 102 to rotate, pulley 108 may be rotated as well.

Pulley 108 may be coupled to shaft 110, which may be a structural element configured to transfer the rotational force generated by the plurality of resistive devices, loop 102, and pulley 108 to generator 112, as discussed in greater detail below. Accordingly, shaft 110 may be directly coupled to pulley 108 by a coupling technique, such as welding. Alternatively, shaft 110 may be coupled to pulley 108 via a gearing mechanism, such as a planetary gear train or gear box, in which pulley 108 may be coupled to a planet gear which may be coupled to a sun gear coupled to shaft 110. Thus, the diameters of the planet gear and the sun gear may be configured to determine a ratio between a rotation of pulley 108 and shaft 110. For example, pulley 108 may rotate at 200 to 300 rotations per minute and may cause, via the gearing mechanism, shaft 110 to rotate at 420 to 500 rotations per minute. In another example, the planetary gear box may be configured to have a ratio of 14:1 which may provide a sufficient conversion of rotational force to drive a hydraulic pump on an airplane.

Power generator 100 may also include generator 112 which may be an electrical generator configured to generate electrical power based on a rotation of shaft 110. Accordingly, generator 112 may be configured to convert a mechanical force transferred by the rotation of shaft 110 into an electromotive force, or electrical energy that is supplied to the vehicle's electrical system. For example, the electrical energy generated by generator 112 may be provided to avionics and communications systems of an airplane. In some embodiments, instead of generator 112, power generator 100 may include a hydraulic pump. Thus, a hydraulic pump may convert a mechanical force transferred by a rotation of shaft 110 into a pressure delivered to or provided to one or more of the vehicle's hydraulic systems. For example, when generator 112 is a hydraulic pump or is coupled to a hydraulic pump and loop 102 is deployed and operational, the hydraulic pump may achieve an outlet flow of 40 gallons per minute.

In various embodiments, one or more components of power generator 100 may be configured to lock loop 102 in place such that loop 102 and the plurality of resistive devices coupled to loop 102 cannot rotate and function as a drag chute that provides reverse thrust that opposes the current direction of the motion of the plane. Thus, when locked in place, loop 102 and its plurality of resistive devices are not able to rotate and may function as a conventional drag chute. In some embodiments, the gearing mechanism may be configured to lock the rotation of loop 102. Alternatively, power generator 100 may further include a locking mechanism, such as a wheel lock, that is configured to lock the rotation of loop 102.

Moreover, in some embodiments, loop 102 is detachable. Thus, in response to automatically detecting a condition, such as a snag, interruption in rotation, or a large tensile force, one or more components of power generator 100 may cause the automatic release of loop 102. For example, loop 102 or pulley 108 may include a quick release mechanism configured to activate in response to detecting one or more of the aforementioned conditions. In some embodiments, the release of loop 102 may occur in response to an input provided by a user. For example, a pilot may provide an input to a button in a cockpit of the vehicle. In response to receiving the input, the button may cause one or more components of power generator 100 to release loop 102.

FIG. 2A illustrates another example of a power generator that may be deployed from a vehicle, in accordance with some embodiments. As similarly discussed above with reference to power generator 100, power generator 200 may include loop 202, resistive device 204, resistive device 206, pulley 208, shaft 210, and generator 212. However, as shown in FIG. 2, loop 202 and the plurality of resistive devices coupled to loop 202 may be configured in a different structural configuration. For example, as shown in FIG. 2, loop 202 may be configured as a belt having a width configured to house or provide structural support for a side of a pocket or chute. Thus, a resistive device may be a pocket formed by a portion of material attached to or coupled to one or more sides of loop 202.

Accordingly, resistive device 204 may be a pocket or cavity formed by a portion of material coupled to loop 202. The material may be the same material as loop 202, or the same material as those discussed with reference to resistive device 104 of FIG. 1. Resistive device 204 may be configured in a first configuration having an opening facing a direction opposite to the direction of a flow of a medium that loop 202 is passing through. For example, if loop 202 is housed by and coupled to an airplane in flight, the opening of resistive device 204 may face a direction opposite to the flow of air past the airplane. In this way, the air may be caught or collected in the pocket formed by resistive device 204, thus generating a force, such as a drag force, that may be transferred to loop 202 and cause the rotation of loop 202 in a first direction.

Moreover, loop 202 may also be coupled to resistive device 206 which may be configured in a second configuration having an opening facing the same direction as a flow of the medium that loop 202 is passing through. Returning to the previous example, because the opening is not facing the flow of air past the airplane, no air is collected or caught in the pocket formed by resistive device 206, and no significant force is generated. Thus, resistive devices configured and oriented as resistive device 206 do not generate any significant force that opposes the force generated by resistive device 204. In this way, resistive devices configured and oriented in the first configuration may generate a force that is transferred to loop 202 in one rotational direction, while resistive devices configured and oriented in the second configuration do not generate a force. As similarly discussed above with reference to FIG. 1, as loop 202 rotates, a resistive device coupled to loop 202 may be configured to toggle or switch between the first configuration and the second configuration thus ensuring that a rotational force is generated and transferred to loop 202 in a single rotational direction.

Loop 202 may be coupled to pulley 208 and may cause pulley 208 to rotate. For example, pulley 208 may have a groove around its outer surface or edge in which loop 202 is seated. In this example, a frictional coefficient in a contact area between pulley 208 and loop 202 may be sufficient to couple loop 202 to pulley 208 and transfer a rotational force from loop 202 to pulley 208, thus causing pulley 208 to rotate. In another example, loop 202 may have perforations in one or more portions such as one or more outer edges. Pulley 208 may be configured to have pegs or other structural members configured to temporarily fit in the perforations of loop 202 in a contact area between loop 202 and pulley 208. The coupling between the perforations and the structural members may be sufficient to transfer a rotational force from loop 202 to pulley 208 and cause pulley 208 to rotate.

As similarly discussed above with reference to FIG. 1, pulley 208 may be coupled to shaft 210 and cause shaft 210 to rotate. Shaft 210 may be coupled to generator 212. In some embodiments, a gearing mechanism may be used to couple shaft 210 to generator 212. Generator 212, may convert the rotational force to electrical or hydraulic power and provide the generated power to one or more systems of the vehicle that houses power generator 200.

Figure 2B:
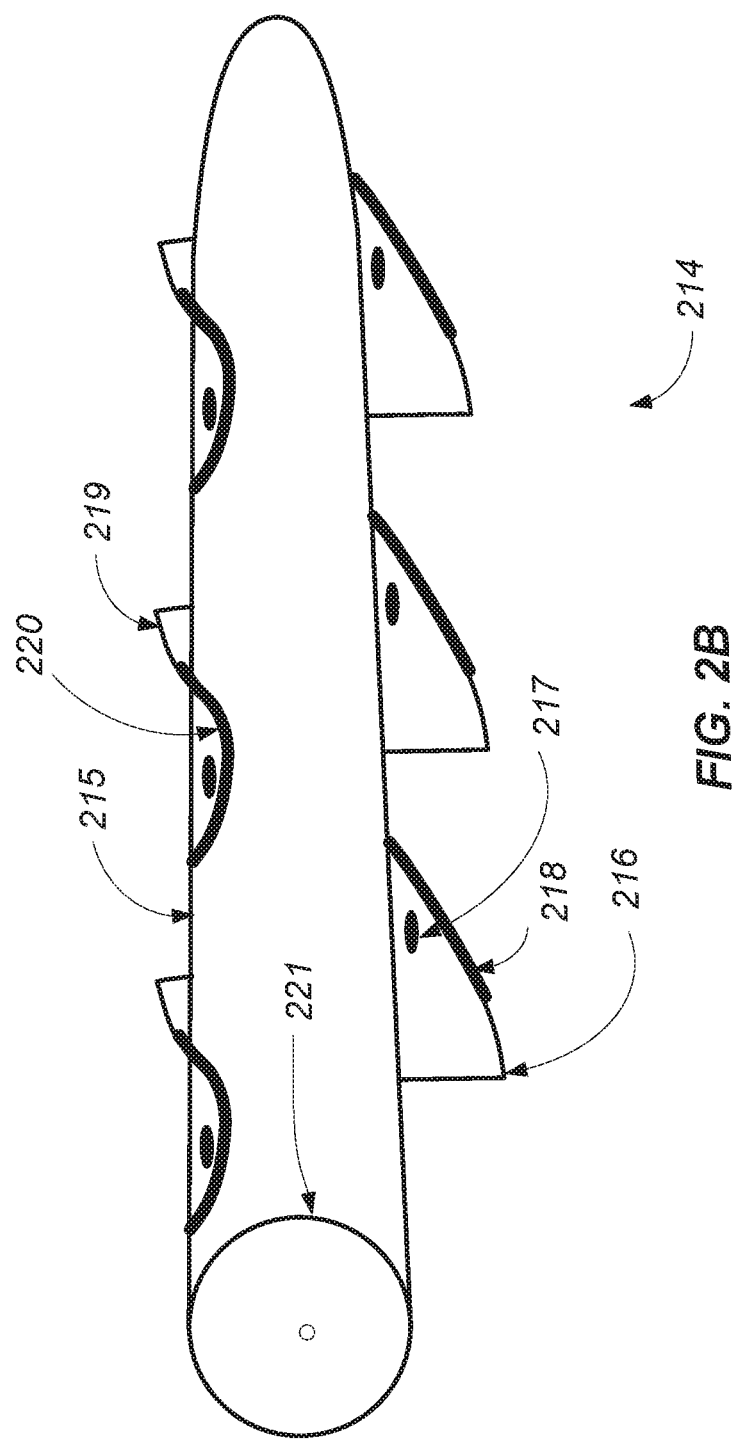
FIG. 2B illustrates yet another example of a power generator that may be deployed from a vehicle, in accordance with some embodiments.

FIG. 2B illustrates yet another example of a power generator that may be deployed from a vehicle, in accordance with some embodiments. As similarly discussed above with reference to power generator 200, power generator 214 may include loop 215, resistive device 216, resistive device 219, and pulley 221. In various embodiments, resistive devices included in power generator 214 may include vent 217 and batten 218. Vent 217 may be an exhaust vent or hole in a portion of a resistive device, such as resistive device 216. Vent 217 may allow a portion of the medium passing by loop 215 and collected in resistive device 216 to escape or leave resistive device 216, thus preventing tearing or other structural damage to resistive device 216. Batten 218 may be a rigid or semi-rigid structural member made of a material, such as fiberglass, and configured to provide structural support for resistive devices coupled to loop 215. When in a first configuration, as illustrated by resistive device 216, a batten, such as batten 218, may provide structural support for the material of resistive device 216, which may be a pocket or chute. When in a second configuration, as illustrated by resistive device 219, a batten, such as batten 220, may bow backwards to collapse resistive device 219 and provide minimal resistance to the medium through which power generator 214 is traveling.

FIG. 2C illustrates an additional example of a power generator that may be deployed from a vehicle, in accordance with some embodiments. As similarly discussed above with reference to power generator 200 and power generator 214, power generator 222 may include loop 223, resistive device 224, resistive device 227, and pulley 228. As similarly discussed above, vent 225 may allow a portion of the medium passing by loop 223 and collected in resistive device 224 to escape or leave resistive device 224, thus preventing tearing or other structural damage to resistive device 224. Air cell 226 may be a lumen or tube that may be stitched into a resistive device, such as resistive device 224. Air cell 226 may be configured to capture air flowing by power generator 222, and further configured to inflate based on the captured air. Air cell 226 may include vent 230, which may be configured to release the captured air. When in a first configuration, an air cell, such as air cell 226 may inflate based on a flow of air past power generator 222. When inflated, air cell 226 may provide structural support for resistive device 224. When in a second configuration, an air cell, such as air cell 229, may deflate such that resistive device 227 lies flat on loop 223 and provides minimal resistance to the medium through which power generator 222 is traveling.

FIG. 2D illustrates a front view of an example of a resistive device, in accordance with some embodiments. As discussed above with reference to FIG. 2C, resistive device 224 may include air cell 226 and vent 230. As illustrated in FIG. 2D, when in the first configuration, air cell 26 is inflated and provides structural support for resistive device 224 that maintains resistive device 224 in the first configuration.

Figure 3:
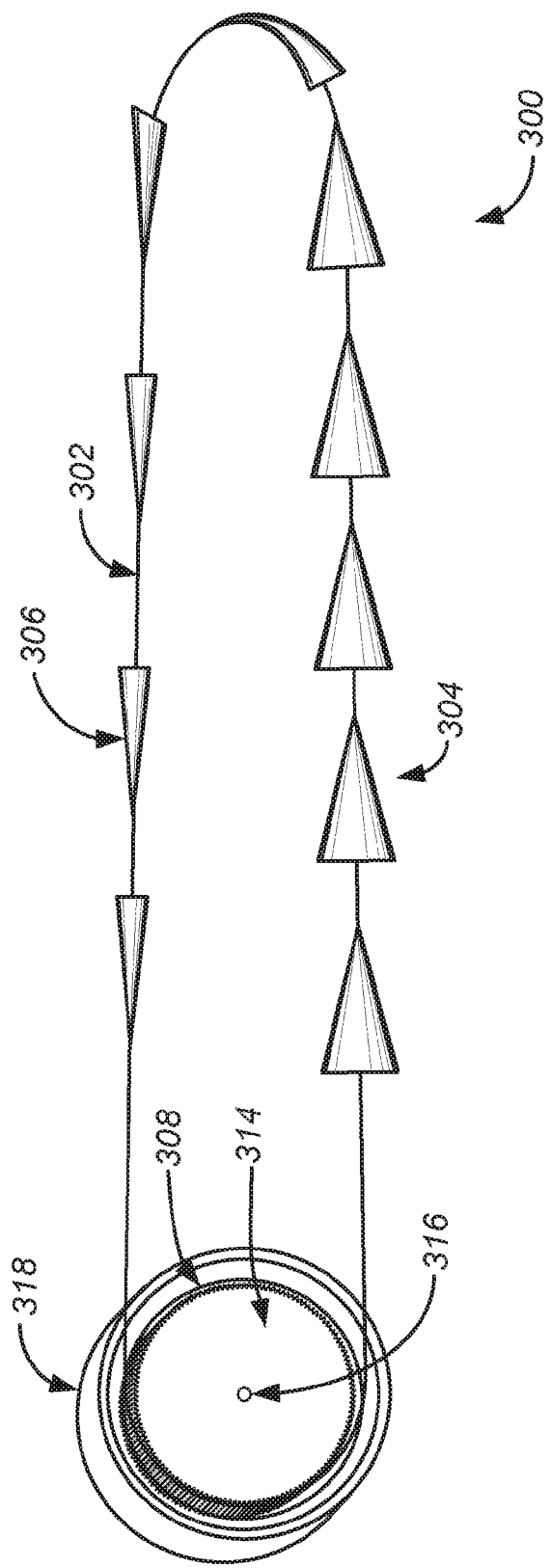
FIG. 3 illustrates an example of a power generator that includes in accordance with some embodiments.

FIG. 3 illustrates an example of a power generator 300 that includes multiple loops, in accordance with some embodiments. As similarly discussed above, a vehicle, such as an airplane, may have various electrical and hydraulic systems that have various power requirements. Some systems may require a large amount of power, while other systems require a small amount of power. Accordingly, power generator 300 may be configured to include multiple loops that are each configured to generate an amount of power specific to a particular system or group of systems in a vehicle. For example, an airplane's high power systems may be powered by a first loop configured to generate a large amount of power, while the airplane's low power systems may be powered by a second loop configured to generate a small amount of power. The loops may be deployed independently or concurrently based on the power needs of the vehicle in a particular situation, such as an emergency situation.

Accordingly, power generator 300 may include a first loop, such as loop 302, and a second loop, such as loop 308. Loop 302 may include a plurality of resistive devices configured to generate power for a first set of systems in a vehicle, which may have lower power requirements, such as an airplane's avionics and navigation systems. Such systems may frequently be used during high altitude operations in which the air through which an airplane travels is thinner and passes the airplane at a higher speed. One or more parameters of loop 302 and the plurality of resistive devices may be configured to generate an amount of power that is compatible with the first set of systems and compatible with high altitude operations. For example, a length of loop 302, a number of resistive devices coupled to loop 302, and a diameter of resistive devices, such as resistive device 304 and resistive device 306, may be determined based on a power requirement of the first set of systems and operation conditions associated with the first set of systems.

Similarly, loop 308 may include a plurality of resistive devices configured to generate power for a second set of systems in the vehicle, which may have high power requirements, such as the an airplane's environmental control systems, flap/slat drive systems, and landing gear. Such systems may frequently be used during low altitude operations in which the air through which the airplane travels is thicker and passes the airplane at a lower speed. Thus, a length of loop 308, a number of resistive devices coupled to loop 308, and a diameter of the resistive devices may be determined based on a power requirement of the second set of systems and operation conditions associated with the second set of systems. In this example, because the second set of systems has a higher power requirement than the first set of systems, one or more parameters of loop 308 may be different than those of loop 302. For example, loop 308 may have more resistive devices that have larger diameters than those of loop 302.

Loop 302 and loop 308 may both be coupled to pulley 314. As similarly discussed above with reference to FIG. 1 and FIG. 2, loop 302 and loop 308 may be configured to rotate pulley 314, which may also cause the rotation of shaft 316. Shaft 316 may be coupled to generator 318, which may convert a rotational force transferred by shaft 316 into electrical or hydraulic power. As illustrated in FIG. 3, one or more of loop 302 and loop 308 may be deployed. In this instance, loop 302 is deployed and generating power, while loop 308 is not. In various embodiments, power generator 300 may include multiple pulleys. Thus, each of loop 302 and loop 308 may be coupled to its own pulley. The multiple pulleys may be coupled to multiple generators, or may be coupled to the same generator, such as generator 318, via one or more gearing mechanisms. Accordingly, while FIG. 3 illustrates an example of a configuration of power generator 300 that has multiple loops, multiple configurations of loops, pulleys, and generators are contemplated and disclosed herein.

Figure 4A:
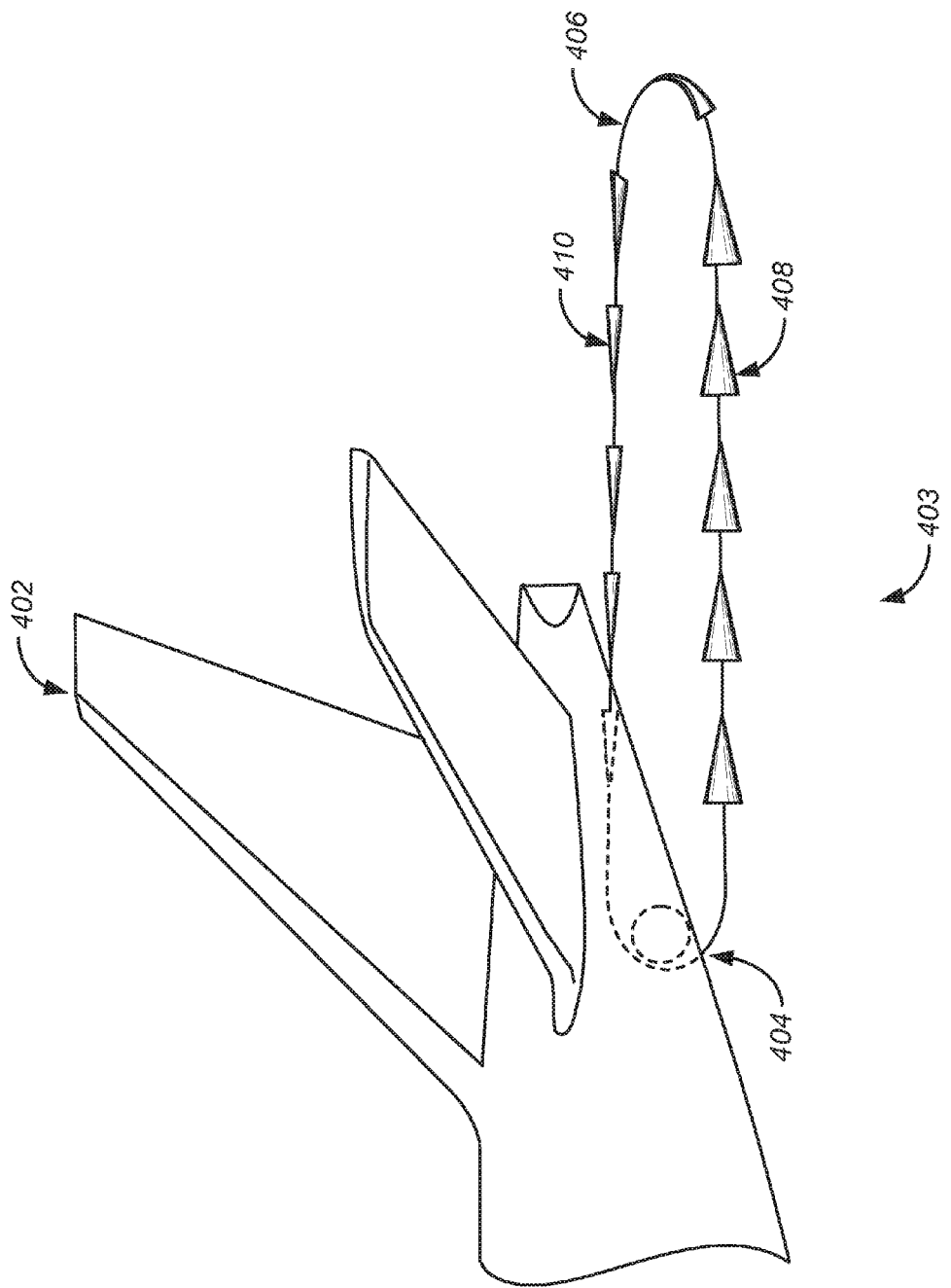
FIG. 4A illustrates a side view of a vehicle that has deployed a power generator, in accordance with some embodiments.

FIG. 4A illustrates a side view of a vehicle that has deployed a power generator, in accordance with some embodiments. As similarly discussed above, a vehicle, such as vehicle 402, may be an airplane configured to deploy power generator 403 in response to a situation or condition, such as a loss of power. Power generator 403 may include loop 406 and a plurality of resistive devices, such as resistive device 408 and resistive device 410. In some embodiments, power generator 403 may be anchored to or coupled to vehicle 402 at attachment point 404, which may include a compartment, such as storage compartment 103 discussed with reference to FIG. 1. The compartment may be configured to house one or more components of power generator 403, such as a generator and a pulley. In various embodiments, attachment point 404 may be configured to evenly distribute a force, such as a drag force, generated by one or more components of power generator 403. For example, attachment point 404 may be positioned halfway between the top and bottom of a rear portion of a fuselage of vehicle 402 so that the drag generated by the resistive devices of power generator 403 is evenly distributed about the centerline of vehicle 402 and does not deleteriously affect steering of vehicle 402.

FIG. 4B illustrates a top view of a vehicle that has deployed a power generator, in accordance with some embodiments. As similarly discussed above with reference to FIG. 4A, vehicle 402 may be configured to deploy power generator 403 that may include loop 406 which may be coupled to a plurality of resistive devices, such as resistive device 408. As shown in FIG. 4B, power generator 403 may be coupled to vehicle 402 at attachment point 404 which may be configured to evenly distribute a drag force generated by power generator 403. For example, attachment point 404 may be positioned along a centerline of a fuselage of vehicle 402 and halfway between horizontal stabilizers of vehicle 402. In this way, drag generated by power generator 403 is evenly distributed along a lateral or horizontal direction of vehicle 402 and does not affect horizontal steering of vehicle 402.

Figure 5:
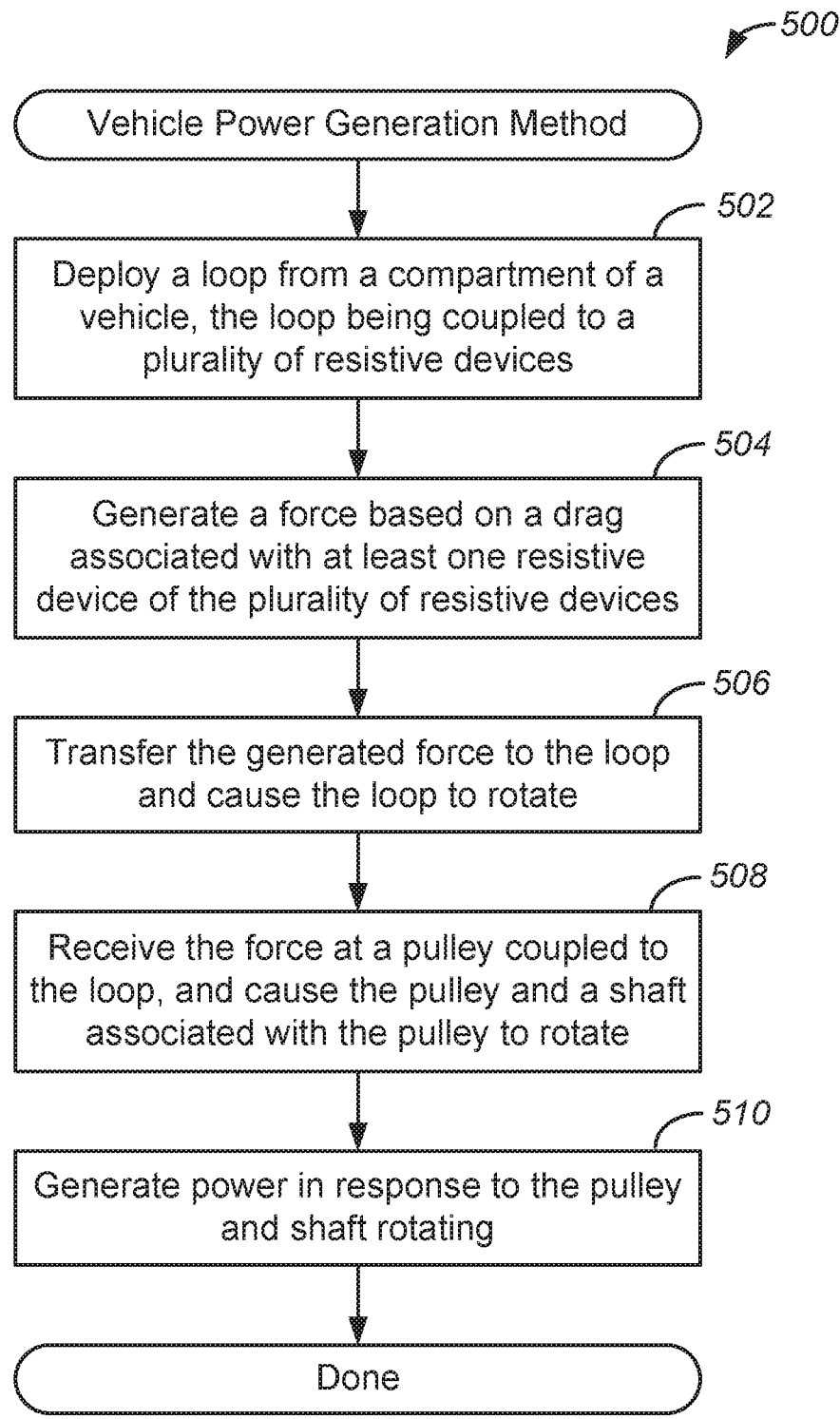
FIG. 5 illustrates an example of a flow chart of a method for deploying a power generator from a vehicle, implemented in accordance with some embodiments.

FIG. 5 illustrates an example of a flow chart of a method 500 for deploying a power generator from a vehicle, implemented in accordance with some embodiments. As similarly discussed above, a vehicle may experience a situation or condition in which additional power is needed to power the vehicle's systems. In such a situation, a power generator may be deployed to generate additional power for the vehicle.

Accordingly, at step 502, a loop may be deployed from a compartment of a vehicle. The loop may be deployed automatically and in response to one or more sensing devices detecting or identifying one or more conditions, such as the failure of a primary power system. The loop may also be deployed manually, and in response to a user input. For example, a pilot or co-pilot of an airplane may provide an input to a button in the cockpit that causes the deployment of the loop. The loop may be deployed from a storage compartment in a portion of the vehicle. For example, an airplane may store the loop in a storage compartment in an empennage section of the plane. The storage compartment may include a set of exterior doors that open and enable the loop to be deployed from the interior of the storage compartment. As similarly discussed above, the loop may be coupled to a plurality of resistive devices which cause the loop to rotate when deployed.

Therefore, at step 504, a force may be generated based on a drag associated with at least one resistive device of the plurality of resistive devices. Once deployed, the loop and the plurality of resistive devices coupled to the loop are immersed in the airstream or flow of air that surrounds the vehicle. One or more of the resistive devices may be oriented to generate a drag force in response to contacting the flow of air. For example, several drag chutes coupled to the loop may inflate and generate a force based on a resistance to the flow of air. As similarly discussed above, the plurality of resistive devices are configured such that the resistive devices that are coupled to a particular portion or side of the loop generate a drag force, while the other resistive devices coupled to the loop do not.

At step 506, the generated force may be transferred to the loop and cause the loop to rotate. The force may be transferred to the loop from the each of the resistive devices via a structural member that couples the each resistive device to the loop. As similarly discussed above, each resistive device may be coupled to the loop by a fastening device or mechanism such as a clamp, series of staples or stitches, or adhesive or chemical bond. Therefore, a drag force generated by a resistive device's resistance to a flow of air may be transferred to the loop and cause the loop to rotate. Because the resistive devices are configured to generate a force on a single side or a particular portion of the loop, the total drag force transferred to the loop may be a unidirectional rotational force that causes the loop to rotate in a single direction.

At step 508, a pulley coupled to the loop may receive the force transferred to the loop. The received force may cause the pulley and a shaft associated with the pulley to rotate. Thus, a contact area between the loop and the pulley may have a sufficient frictional coefficient to enable the transfer of the rotational force from the loop to the pulley, thus causing the pulley and its associated shaft to rotate. As similarly discussed above, the pulley may also use additional coupling mechanisms, such as matching pegs and perforations, to enhance or provide mechanical coupling between the loop and the pulley that is sufficient to enable the transfer of the rotational force from the loop to the pulley and shaft.

At step 510, a power generator may generate power in response to the pulley and shaft rotating. The power generator may be configured to convert a mechanical rotation of the shaft into electrical energy or hydraulic power. Thus, in response to the shaft rotating, the generator may generate electrical power and provide the power to one or more systems of the vehicle. In some embodiments, the generator may generate a signal that is provided to one or more portions of the vehicle, and that provides information or data about the functionality of the generator. For example, the generator may generate a first signal that indicates that the generator is operational and that the loop has been deployed. The generator may also generate a second signal which provides data about the operation of the generator, such as a number of rotations per minute that the loop is rotating at, and a total power output of the generator.

Figure 6:
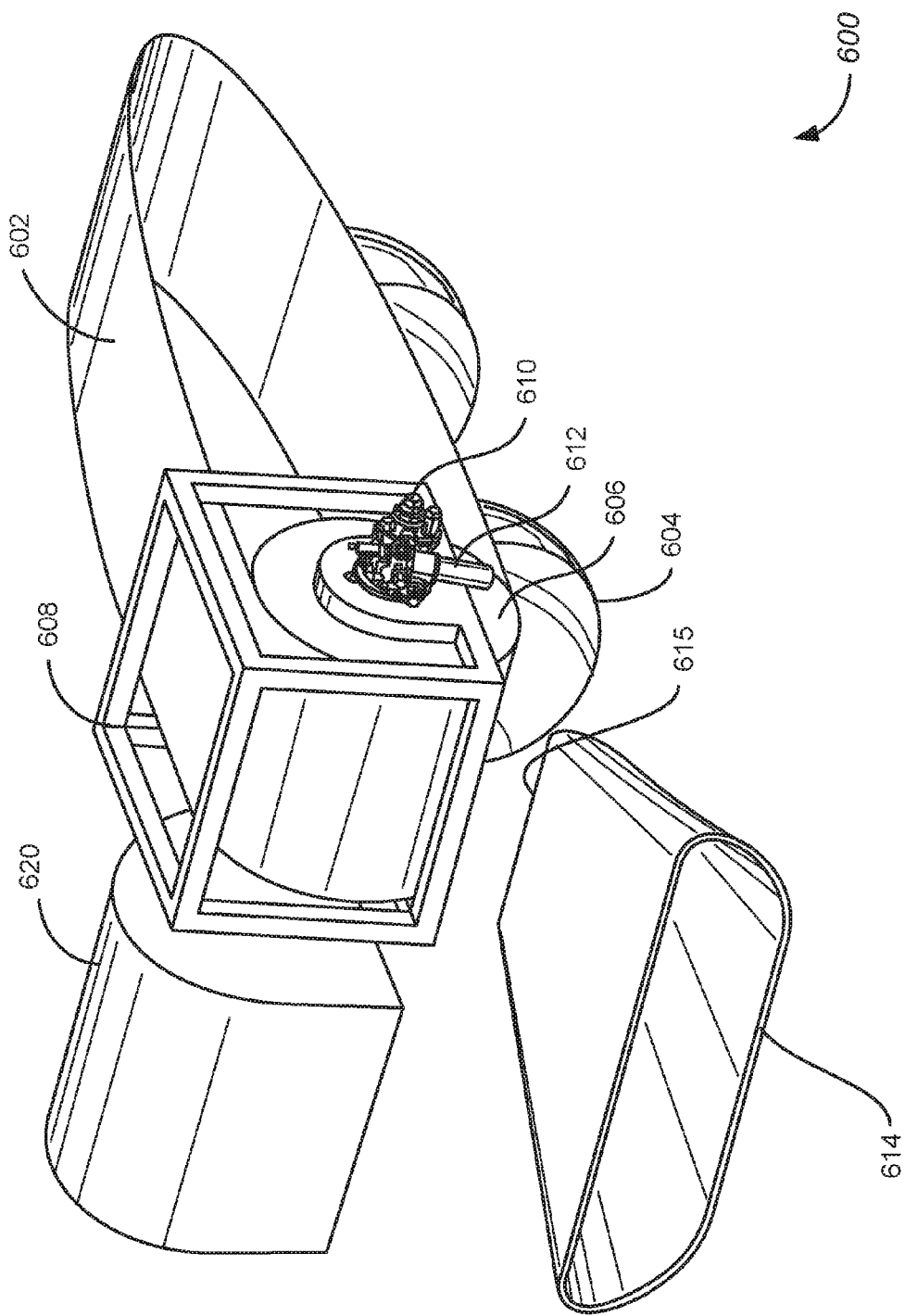
FIG. 6 illustrates an example of a power generator with a flow control device, configured in accordance with some embodiments.

FIG. 6 illustrates an example of a power generator with a flow control device, configured in accordance with some embodiments. As will be discussed in greater detail below, a flow control device, such as flow control device 614, may be utilized in conjunction with other components of a power generator apparatus or system, such as power generator 600, to facilitate operation of power generator 600 in various different operational environments. For example, the selective deployment of flow control device 614 may enable power generator 600 to be deployed and effectively generate power at both high and low speeds of operation. As discussed previously and in greater detail below, deployed or a deployed position may refer to a position in which a component, such as a power generator or flow control device is not in a stowed position contained within a vehicle, and has instead been moved outwards a particular distance relative to the center of the vehicle. In one example, when deployed, all components of power generator 600 are moved outwards relative to a center of the vehicle.

As similarly discussed above, a power generator, such as power generator 600 may include a loop, such as loop 602, which may be coupled with various resistive devices, such as resistive device 604. Accordingly, loop 602 may be implemented as discussed above with respect to loop 102, and may incorporate any of the previously described properties, configurations, and/or materials. Moreover, resistive devices, such as resistive device 604 may also incorporate any of the previously described properties, configurations, and/or materials discussed above with reference to resistive devices 104 and 106. Similarly, generator 620, shaft 610, and pulley 606 may be implemented as discussed above with reference to generator 112, shaft 110, and pulley 108.

In various embodiments, loop 602 may be further coupled to pulley 606, which may be coupled, via shaft 610, to generator 620, which may be configured to generate power and provide power to other vehicle components via electrical connections. Accordingly, when deployed, air passing by the vehicle in which power generator 600 is implemented, such as an airplane, may interact with resistive devices such as resistive device 6104 and generate a rotational force applied to loop 602 that causes loop 602 to rotate. Moreover, as similarly discussed above, such rotational force may be transferred to pulley 606 as well as generator 620, and used to generate electrical power that may subsequently be provided to various other systems and components of the vehicle.

In various embodiments, mechanical device 612 may be coupled to pulley 606 and support member 608 associated with pulley 606. Furthermore mechanical device 612 may be coupled to additional support members associated with the structure of the vehicle in which pulley 606 is implemented in. More specifically, mechanical device 612 may be coupled to one or more attachment points of a vehicle's internal support structure. For example, mechanical device 612 may be coupled to attachment points of an airplane's airframe. As will be discussed in greater detail below, such attachment points may be included in a lower rear portion of the airplane's fuselage thus enabling power generator 600 to be deployed from the lower rear portion of the airplane. In various embodiments, mechanical device 612 may be configured to enable the movement of components of power generator 600 in various directions, such as a vertical axis relative to the vehicle, which may be an airplane. Accordingly, as will be discussed in greater detail below, mechanical device 612 may be configured to move power generator 600, and to lower power generator 600 into the flow of air passing by the vehicle in which power generator 600 is housed. Thus, when power generator 600 is deployed, mechanical device 612 may be configured to lower power generator 600, and in some embodiments, pulley 606 and/or generator 620, into the passing air stream such that resistive devices such as resistive device 604 are able to better contact the passing air stream and more effectively generate a rotational force.

In various embodiments, mechanical device 612 may be a hydraulic actuator controlled by a hydraulic pump, may be an electric actuator, or may be a spring-tensioned rod. In various embodiments, mechanical device 612 may include a set of support rails that utilize gravity to move power generator 600 in a downward direction. Accordingly, when exterior doors of the vehicle are opened, a gravitational force on the components of power generator 600 may cause power generator 600 to move downwards in a direction and extent controlled by mechanical device 612.

In various embodiments, power generator 600 may further include flow control device 614 which may be configured to modify or adjust an airflow received by the resistive devices, such as resistive device 604. As previously discussed, power generator 600 may be implemented and used in a variety of operational environments. More specifically, within a particular vehicle, such as an airplane, power generator 600 may be implemented at various different speeds of operation, and consequently have various power generation characteristics and tolerances at each respective speed. At a greater speed, power generator 600 may be able to generate an increased quantity of power. Due to increased frictional forces associated with the passing air, smaller resistive devices may be used to avoid damage from excessive resistive forces caused by interactions between the resistive devices and the passing air. However, such smaller resistive devices may not be as effective at generating power at lower speeds. For example, at a lower speed, it may be more difficult for power generator 600 to generate power because less force is generated by the passing air. While, larger resistive devices may be used to generate sufficient power at relatively lower speeds, such larger resistive devices may incur damage from excessive resistive forces at higher speeds. Accordingly, a particular size or geometry of a resistive device may be suited for a high operational speed or a low operational speed, but might not be equally effective at both operational speeds.

Accordingly, flow control device 614 may facilitate and enable the consistent generation of power by power generator 600 across various different operational speeds. In one example, resistive devices, such as resistive device 604, may be configured to enable efficient generation of power at relatively high operational speeds while not incurring excessive resistive forces. For example, the resistive devices may enable the generation of sufficient electrical power by power generator 600 at speeds of over 130 knots. However, at speeds under 130 knots, the force provided by passing air might not be sufficient to enable the generation of sufficient power by power generator 600, Accordingly, flow control device 614 may be configured to modify and shape a flow of air provided to the resistive devices.

As shown in FIG. 6, flow control device 614 may be selectively deployed upstream from loop 602 and its associated resistive devices. Accordingly, as similarly discussed above, flow control device 614 may be coupled with a second mechanical device that may be configured to move flow control device 614 in various directions, such as a vertical direction relative to the vehicle in which power generator 600 is implemented. As also discussed above, the second mechanical device may be an actuator, a spring-tensioned rod, or a set of support rails. Accordingly, when deployed, flow control device 614 may drop downwards directly upstream of the resistive devices. As will be discussed in greater detail below, the deployment of flow control device 614 may be controlled by one or more other system components, such as a control logic that may be included in or associated with the vehicles control systems. Accordingly, flow control device 614 may be deployed responsive to detecting or determining one or more conditions. More specifically, if it is detected that the vehicle is traveling at a speed slower than a designated threshold and requires emergency power generation, flow control device 614 may be deployed. In one example, if power generator 600 is implemented in an airplane, and the airplane slows below 130 knots, flow control device 614 may deploy. In various embodiments, deployment of flow control device 614 may also be responsive to a measured power level falling below a threshold value.

In various embodiments, flow control device 614 may be configured to modify or change local airflow to increase a speed of the airflow provided at an output of flow control device 614. For example, flow control device 614 may be configured to have a funnel shape or may be configured as a nozzle that is configured to have an input configured to receive airflow having a first speed, and further configured to have an output that generates airflow having a second speed. Moreover, the second speed may be greater than the first speed. In this way, flow control device 614 may be configured to aggregate a first airflow received at a first cross sectional area of the input, condense and concentrate the received airflow to generate a second airflow provided at the output having a second cross sectional area that may be smaller than the first cross sectional area. As discussed above, the output of flow control device 614 may be configured to be aligned with the resistive devices of loop 602. Accordingly, the increased airflow generated by flow control device 614 may be provided directly to the resistive devices, such as resistive device 604, and may be used to generate power, this way, flow control device 614 may be configured to provide a localized increase in a speed of air passing by the vehicle, and such a localized increase in speed may be utilized to enhance and increase the power generated by power generator 600.

Furthermore, one or more portions of flow control device 614 may be adjustable to modify or adjust a ratio or relationship between the input airflow speed and the output airflow speed. In some embodiments, a diameter and/or cross-sectional area or geometry of output 615 may be changed to increase or decrease the output airflow speed of flow control device 614 and increase or decrease the ratio of the output airflow speed to the input airflow speed. For example, if the diameter of output 615 is decreased, the output airflow speed may be increased as more airflow is being concentrated into a smaller area. Accordingly, flow control device 614 may provide a greater increase in localized airflow to resistive devices such as resistive device 604. Moreover, if the diameter of output 615 is increased, the output airflow speed may be decreased. In this way, the localized airflow enhancement provided by flow control device 614 may be adjusted and configured based on the utilization characteristics of resistive devices such as resistive device 604. Moreover, adjustment and configuration may be implemented during operation of flow control device 614.

As disclosed herein, the increase in speed of airflow provided by flow control device 614 may be relatively large. More specifically, the speed of airflow provided at the output of flow control device 614 may be significantly higher than the ambient flow of air past the vehicle. In a specific example, flow control device 614 may be configured to convert airflow received at its input having a speed of 130 knots to an airflow provided at its output having an airspeed of Mach 0.5 (or about 330 knots). Accordingly, while air passing by the vehicle may have a speed of about 130 knots, the speed of the flow of air provided to the resistive device of power generator 600 is about 330 knots. Such a localized increase in speed of airflow enables the use of smaller resistive devices which may also be compatible with higher airflow speeds, and also weigh less than larger resistive devices that may otherwise be used for low speed operation. In this way, a single configuration of a power generator and flow control device may be implemented within a vehicle for both low speed and high speed operation. While embodiments make reference to 130 knots as a speed at which a flow control device may be deployed, embodiments as disclosed herein may be configured to deploy a flow control device at any suitable speed. For example, when configured to deploy flow control device at speeds lower than 330 knots, smaller resistive devices, such as chutes, may be used. Moreover, deployment at lower speeds may be implemented to increase power output for other vehicle events, such as flap deployment or landing gear deployment.

Figure 7A:
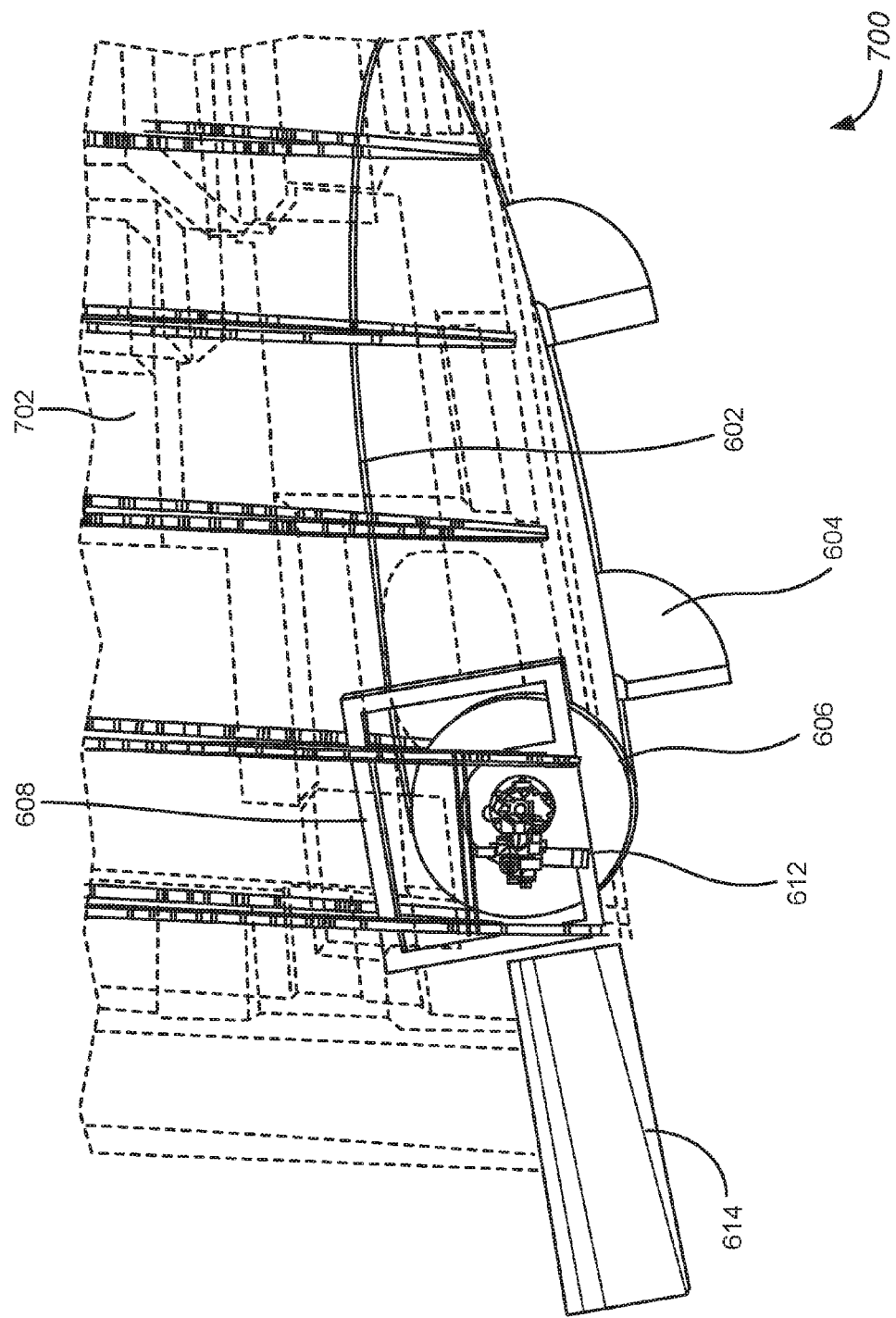
FIG. 7A illustrates an example of a power generator with a flow control device stowed, configured in accordance with some embodiments.

FIG. 7A illustrates an example of a power generator with a flow control device stowed, configured in accordance with some embodiments. Accordingly, FIG. 7A provides a side view of a power generator apparatus or system, such as power generator 600 discussed above, that may be implemented in a vehicle, such as airplane 700. As similarly discussed above, power generator 600 may include resistive devices, such as resistive device 604, which may be coupled to loop 602 and pulley 606 as well as generator 620 and mechanical device 612. As also discussed above, power generator 600 may be implemented in a lower portion of a fuselage, such as fuselage 702. As shown in FIG. 7A, power generator 600 has been deployed and the resistive devices included in power generator 600, such as resistive device 604, are in contact with the air passing by airplane 700. Accordingly, loop 602 may rotate and transfer a rotational force to generator 620 which may subsequently generate emergency power based on the rotational force.

Furthermore, as shown in FIG. 7A, flow control device 614 is not deployed. Accordingly, airplane 700 may still be traveling above a designated threshold speed, as may be determined based on design characteristics of power generator 600. For example, the threshold speed may be determined based on a minimum amount of rotational force over a period of time to generate a minimum amount of emergency power. In this example, because the threshold speed has not been breached, e.g. is greater than the designate threshold speed, there may be sufficient force provided by passing air to generate a sufficient amount of emergency power. As discussed above in a previous example, if the airplane is traveling, for example, above 130 knots, the airflow to the resistive devices may be sufficient to generate enough emergency power to power components of airplane 700. Accordingly, flow control device 614 has not been deployed. In this way, deployment of flow control device 614 may be triggered by an airspeed dropping below a threshold airspeed value, or may be triggered by a power level in one or more electrical systems dropping below a threshold power value.

Moreover, in some embodiments, support member 608 may be coupled to fuselage 702 via a mount or coupler that enables or facilitates an amount of motion. For example, support member 608 may be coupled to fuselage 702 via a swinging mount or hinge that enables a particular amount of movement in one or more directions. More specifically, the swinging mount may enable an amount of lateral motion or rotation thus enabling support member 608 as well as attached components of power generator 600 to move in a lateral or horizontal direction. As will be discussed in greater detail below, enabling such a range of motion may enable dynamic adjustment of the position of the power generator 600 relative to a direction of external airflow, and may increase a tolerance of power generator 600 to turbulence within the external airflow.

While power generator 600 and flow control device 614 are shown in one location of a vehicle, embodiments disclosed herein further contemplate the implementation of power generator 600 and flow control device 614 in other portions of the vehicle, such as a forward portion of an airplane, as well as sides or the top of the vehicle, as may be implemented in side portions or a top portion of a fuselage.

FIG. 7B illustrates an example of a power generator with a flow control device deployed, configured in accordance with some embodiments. Thus, FIG. 7B provides a side view of a power generator apparatus or system, such as power generator 600 discussed above, that may be implemented in a vehicle, such as airplane 700. As discussed above, power generator 600 may include resistive devices, such as resistive device 604, which may be coupled to loop 602 and pulley 606 as well as generator 620 and mechanical device 612. As also discussed above, power generator 600 may be implemented in a lower portion of a fuselage, such as fuselage 702. As shown in FIG. 7B, power generator 600 has been deployed and the resistive devices included in power generator 600, such as resistive device 604, are in contact with the air passing by airplane 700. Accordingly, loop 602 may rotate and transfer a rotational force to generator 620 which may subsequently generate emergency power based on the rotational force.

Furthermore, as shown in FIG. 7B, flow control device 614 has been deployed. In this instance, airplane 700 has slowed down and achieved a speed that is below the designated threshold speed. Accordingly, one or more components of airplane 700, such as an onboard airspeed indicator, may have detected the loss in speed and the breach of the designated threshold speed. In response to detecting the threshold crossing, one or more components of airplane 700, such as control logic, may trigger the deployment of flow control device 614. Accordingly, as shown in FIG. 7B, flow control device 614 may be deployed such that an output of flow control device 614 is provided to the resistive devices of power generator 600. Accordingly, flow control device 614 may provide a localized increase in airflow received by the resistive devices, increase a rotational force generated by the resistive devices, and increase an amount of power generated by power generator 600. Accordingly, returning to a previous example, even if the airspeed of airplane 700 drops below the threshold speed which may be, for example, 130 knots, flow control device 614 may provide significantly greater airflow, which may be, for example, 380 knots, to the resistive devices and may ensure continuous effective operation of power generator 600 to generate a sufficient amount of emergency power for airplane 700.

Figure 8:
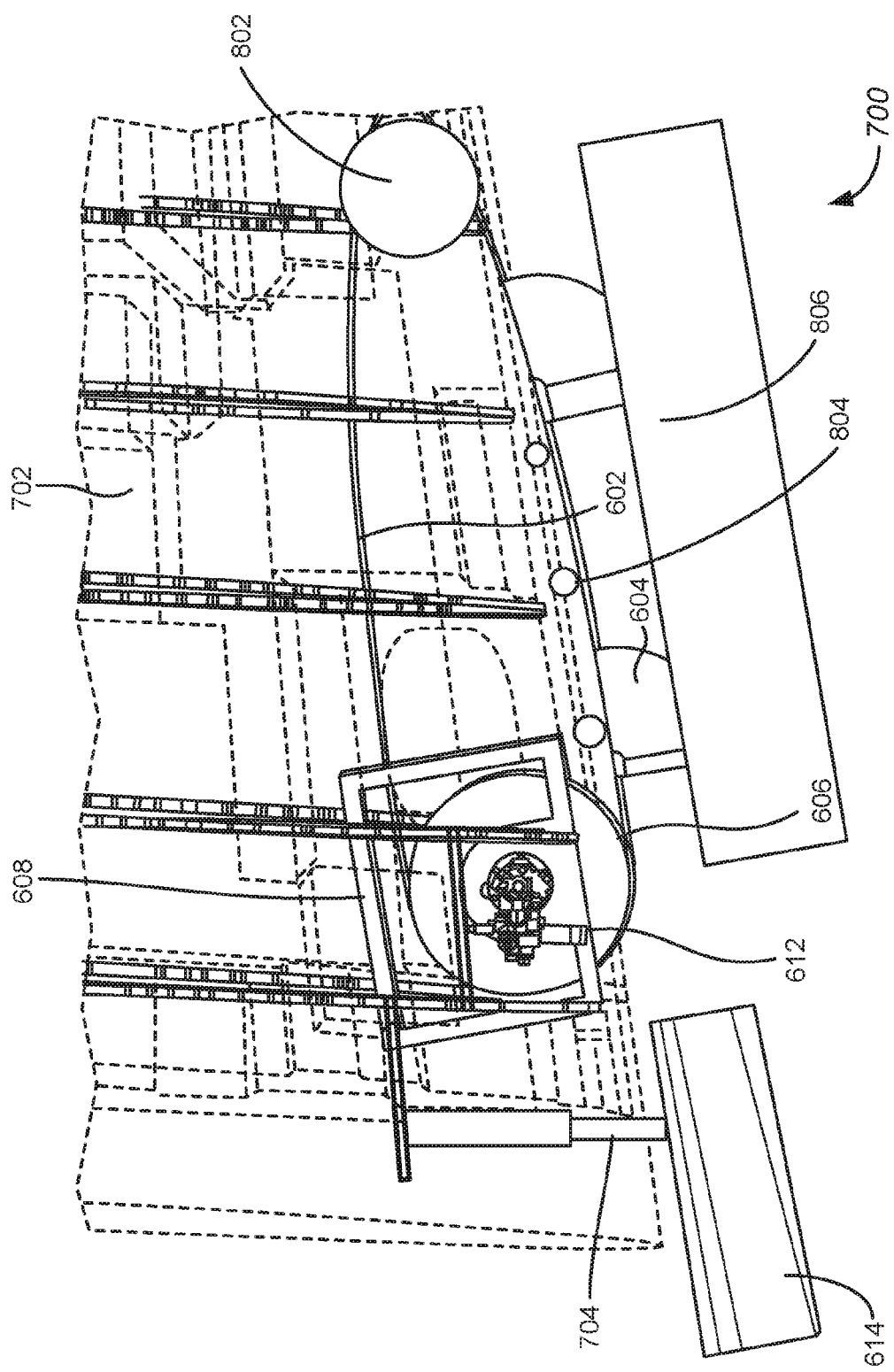
FIG. 8 illustrates another example of a power generator with a flow control device deployed, configured in accordance with some embodiments.

FIG. 8 illustrates another example of a power with a flow control device deployed, configured in accordance with some embodiments. As similarly discussed above, FIG. 8 provides a side view of a power generator apparatus or system, such as power generator 600 discussed above, that may be implemented in a vehicle, such as airplane 700. Power generator 600 may include resistive devices, such as resistive device 604, which may be coupled to loop 602 and pulley 606 as well as generator 620 and mechanical device 612, and may be implemented in a lower portion of a fuselage, such as fuselage 702. As shown in FIG. 8, flow control device 614 has been deployed. Accordingly, airplane 700 as slowed below a designated threshold speed, and flow control device 614 has been deployed to enhance the power generation of power generator 600, as discussed above.

FIG. 8 further illustrates additional components that may be included within power generator 600 for additional structural support. For example, pulley 802 may be positioned opposite pulley 606, and may also be coupled to loop 602. In this way, pulley 606 may be coupled to a first portion of loop 602, and pulley 802 may be coupled to a second portion of loop 602. In some embodiments, the first portion and second portion of loop 602 may be at opposite ends of loop 602. Accordingly, pulley 802 may provide additional stabilization to loop 102 when in operation. In various embodiments, such additional stabilization may prevent entanglement or twisting of loop 102 as may otherwise occur in turbulent cross winds. Moreover, rollers 804 may also be included to provide further stabilization to loop 102. Thus, a lower portion of loop 102 that comes in contact with the ambient air passing by airplane 700 may be further stabilized by rollers 804, and rollers 804 may ensure that resistive devices, such as resistive device 604, are positioned well within the stream of passing air as opposed to being pushed back inside fuselage 702.

FIG. 8 further illustrates door 806 which may provide an external cover for power generator 600 when not deployed. As shown in FIG. 8, door 806 is falling away from airplane 700 in response to the deployment of power generator 600 being activated. Thus, according to some embodiments, in response to detecting a loss in power, or power levels falling below a designated threshold value, door 806 may be opened and/or ejected. In response to door 806 being opened or ejected, power generator 600 may be deployed by, for example, mechanical devices such as mechanical device 612. While FIG. 8 shows door 806 falling away from airplane 700, door 806 may also be configured to swing open on a hinge and rest flush against an exterior of fuselage 702 when open. In some embodiments, door 806 may be configured as a roll up door that rolls to open and rests in a coiled position when opened.

Figure 9:
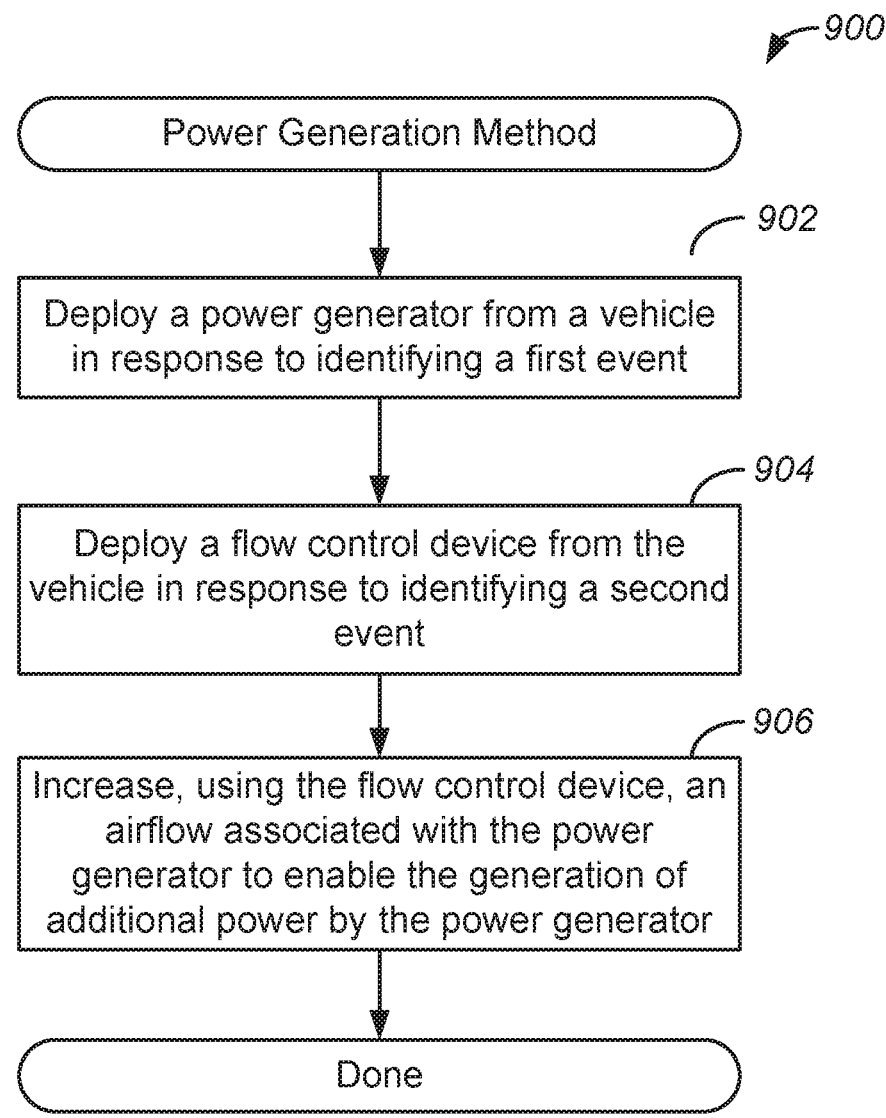
FIG. 9 illustrates a flow chart of an example of a power generation method, implemented in accordance with some embodiments.

FIG. 9 illustrates a flow chart of an example of a power generation method, implemented in accordance with some embodiments. As will be discussed in greater detail below, a power generator may be deployed to generate emergency power for a vehicle based on ambient airflow, such as may be experienced by an airplane in flight. Moreover, a flow control device may be independently deployable to selectively modify or adjust airflow received by the power generator. Accordingly, the flow control device may be deployed to increase an airflow received by the power generator, thus enabling operation of the power generator at lower airplane speeds.

Method 900 may commence with operation 902 during which a power generator may be deployed in response to identifying a first event. As will be discussed in greater detail below, the first event may be a detected loss in power. Accordingly, in response to detecting a loss or decrease in power in one or more of a vehicle's systems, a power generator may be deployed to generate emergency power that supplements power available to the vehicle's systems. In some embodiments, the power generator may be deployed from a first portion of a vehicle.

Method 900 may proceed to operation 904 during which a flow control device may be deployed in response to identifying a second event. As will be discussed in greater detail below, the second event may be an identified loss in vehicle speed. Accordingly, in response to identifying a loss or decrease in the speed of the vehicle, the flow control device may be deployed from a second portion of the vehicle. As previously discussed, the second portion of the vehicle may be in front of or before the first portion.

Method 900 may proceed to operation 906 during which an airflow associated with the power generator may be increased. In some embodiments, the increasing of the airflow enables the generation of additional power by the power generator. Accordingly, the flow control device may be deployed to ensure that the power generator is able to continue generation emergency power that supplements power available to the vehicle's systems despite the loss in airplane speed. In this way, the power generator may effectively and efficiently generate emergency power for the airplane's electrical systems in various operational environments that may include various different vehicular speeds.

Figure 10:
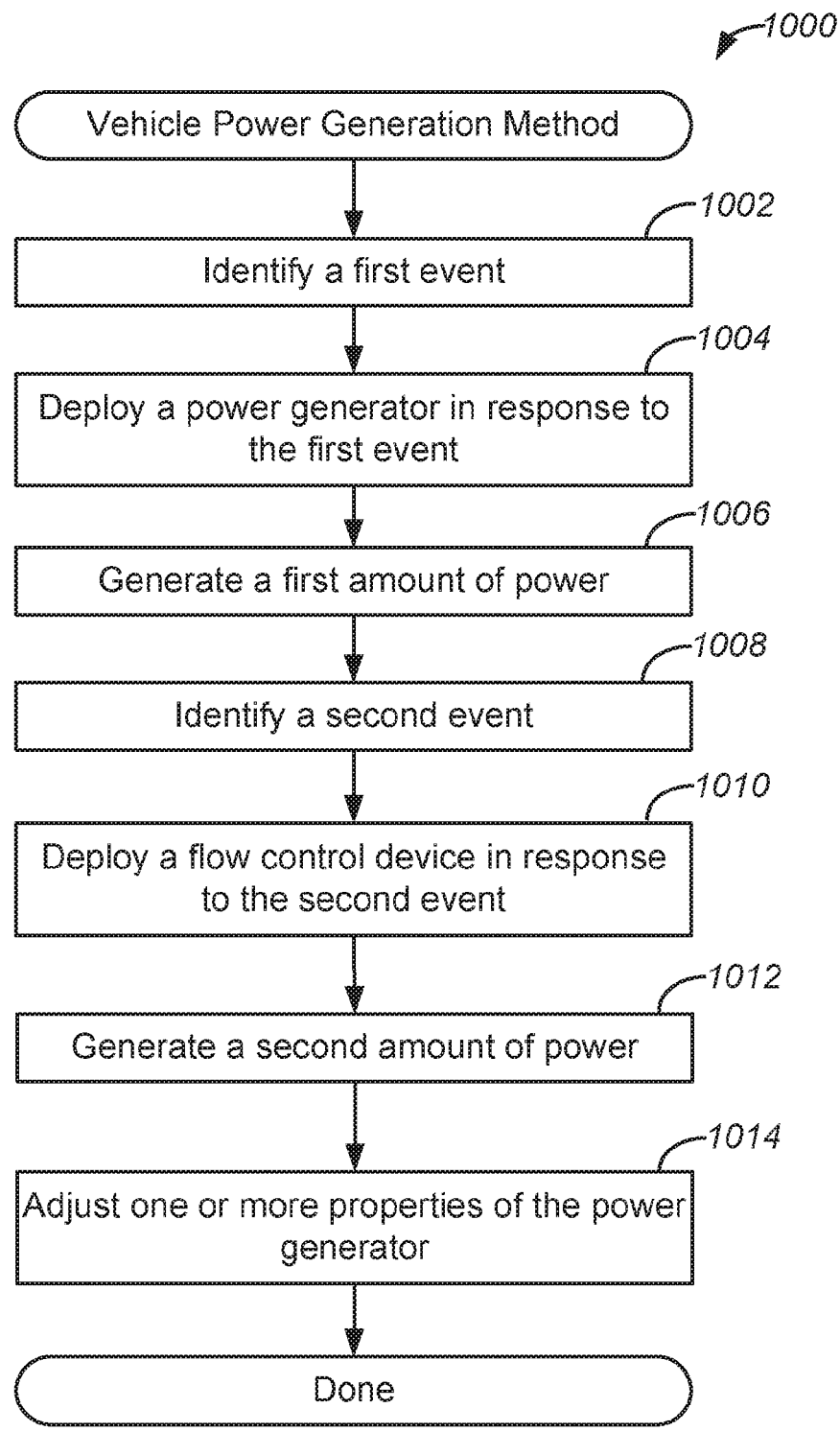
FIG. 10 illustrates a flow chart of another example of a power generation method, implemented in accordance with some embodiments.

FIG. 10 illustrates a flow chart of al other example of a power generation method, implemented in accordance with some embodiments. As similarly discussed above, a power generator may be deployed to generate emergency power for a vehicle based on ambient airflow. In various embodiments, a flow control device may be independently deployable to selectively modify or adjust airflow received by the power generator. Moreover, various properties of the power generator, such as a pitch and angle, may be modified to further adjust the power generated by the power generator.

Method 1000 may commence with operation 1002 during which a first event may be identified. As similarly discussed above, the first event may be associated with a decrease in a power level of one or more systems of a vehicle. For example, the first event may be a power level of an electrical system of an airplane falling below a designated threshold value. Such an event may be identified by one or more monitoring systems aboard the vehicle, such as control logic implemented within the vehicles onboard electrical systems. Accordingly, control logic may periodically measure an available power level in one or more of the vehicle's systems, compare the measured level with a threshold value, and identify, as a first event, any instance of the measured level falling below the threshold value.

Method 1000 may proceed to operation 1004 during which a power generator may be deployed. Accordingly, in response to a measured power level falling below a threshold value, the power generator may be deployed. For example, the control logic may identify first threshold crossing in which a measured power level falls below a first threshold value. The control logic may, in response to identifying the threshold crossing, trigger the opening or release of a door associated with the power generator, and may optionally trigger a movement of a mechanical device associated with the power generator. Accordingly, a door that may be configured to form a portion of a housing used to house the power generator may be opened or released to expose the power generator. Moreover, mechanical devices, such as actuators or support rails, may facilitate the movement of the power generator to a deployed position in which the power generator has been moved outwards from its previous stowed position, and is in contact with external airflow passing by the vehicle.

Method 1000 may proceed to operation 1006 during which a first amount of power may be generated. Thus, once deployed, the power generator may generate power based on ambient airflow, as discussed above. For example, airflow passing by an exterior of the vehicle may interact with resistive devices included in the power generator to create a force which may be transferred to a generator and converted to power. Accordingly, the first amount of power may be provided to the electrical systems of the vehicle and, more specifically, to the system that experienced the decrease in measured power.

Method 1000 may proceed to operation 1008 during which a second event may be identified. As discussed above, the second event may be an airspeed of the vehicle falling below a threshold value. In some embodiments, the control logic may be coupled to an airspeed indicator that is configured to measure an airspeed of the vehicle. Accordingly, the control logic may be configured to periodically measure the airspeed of the vehicle, compare the measured airspeed with a second designated threshold value, and identify, as a second event, any instance of the airspeed falling below the second designated threshold value.

Method 1000 may proceed to operation 1010 during which a flow control device may be deployed. Accordingly, a component, such as the control logic, may trigger the deployment of the flow control device in response to identifying the second event. In various embodiments, the control logic may be configured to deploy the flow control device in response to a combination of the first event and the second event. For example, the flow control device may be deployed in response to identifying the second event, and if the first event has also previously been detected, and/or if the power generator has already been deployed. Accordingly, the control logic may also analyze whether or not there has been a previous loss of power and a deployment of the power generator before deploying the flow control device responsive to identifying the second event. In this way, the control logic may ensure that the flow control device is not deployed anytime the vehicle speed falls below a threshold value, but instead when the vehicle falls below the threshold value and emergency power is already being generated, as may be the case if the power generator has already been deployed. In some embodiments, the deployment may be triggered by operation or release of a mechanical device, such as an actuator or support rails, coupled to the flow control device. In one example, the control logic may release a lock or latch included in the mechanical device that enables the flow control device to use the force of gravity to deploy in an outwards and downwards direction relative to the center of the vehicle. In this way, the flow control device may be deployed independently of the power generator and at a different time than the power generator.

Method 1000 may proceed to operation 1012 during which a second amount of power may be generated. As discussed above, the power generator may generate power based on ambient airflow, as airflow passing by an exterior of the vehicle may interact with resistive devices included in the power generator to create a force which may be transferred to a generator and converted to power. Furthermore, as previously discussed, the airflow received by the resistive devices may be enhanced or augmented by the output of the flow control device that has been deployed. Accordingly, once the airspeed of the vehicle has decreased, the flow control device may be deployed to increase the amount of airflow received by the power generator to increase the amount of power generated by the power generator. Thus, according to some embodiments, the second amount of power generated by the power generator when the flow control device is deployed may be greater than the first amount of power generated by the power generator alone.

Method 1000 may proceed to operation 1014 during which one or more properties of the power generator may be adjusted. In various embodiments, properties, such as a relative position, of the power generator may be adjusted dynamically to compensate for changes in the operational environment in which the power generator is deployed. For example, as discussed above, a first portion of the power generator may be coupled to the vehicle via a swinging mount thus enabling motion of the power generator in a particular direction. For example, the power generator may have a degree of motion in a lateral or horizontal direction relative to the vehicle, which may be an airplane. In this way, the position of the power generator may swing freely and enable dynamic alignment of the power generator with external airflow, and increased compensation for turbulent airflow. Moreover, mechanical devices associated with the power generator may also be adjusted to adjust a pitch or vertical angle of the power generator relative to the vehicle's centerline. In this way, the position of the power generator may be dynamically adjusted to further increase the power generated by the power generator.

While the systems, apparatus, and methods disclosed above have been described with reference to airplanes and the aerospace industry, it will be appreciated that the embodiments disclosed herein may be applied to any other context as well, such as automotive, railroad, and other mechanical and vehicular contexts.

Figure 11:
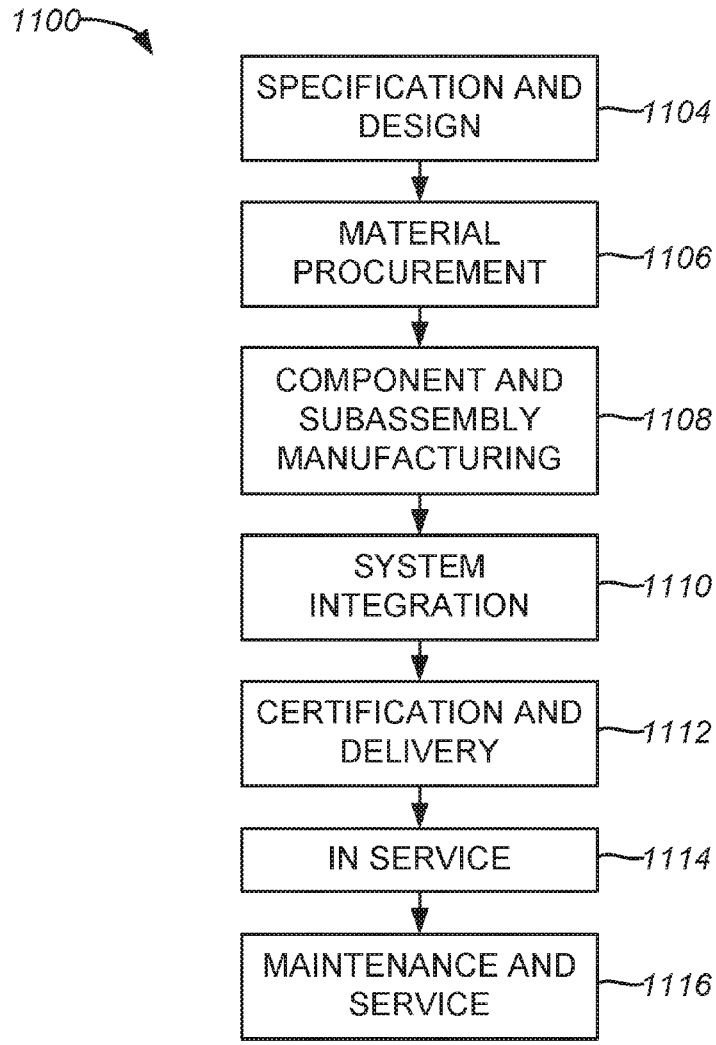
FIG. 11 illustrates a flow chart of an example of an airplane production and service methodology, in accordance with some embodiments.
Figure 12:
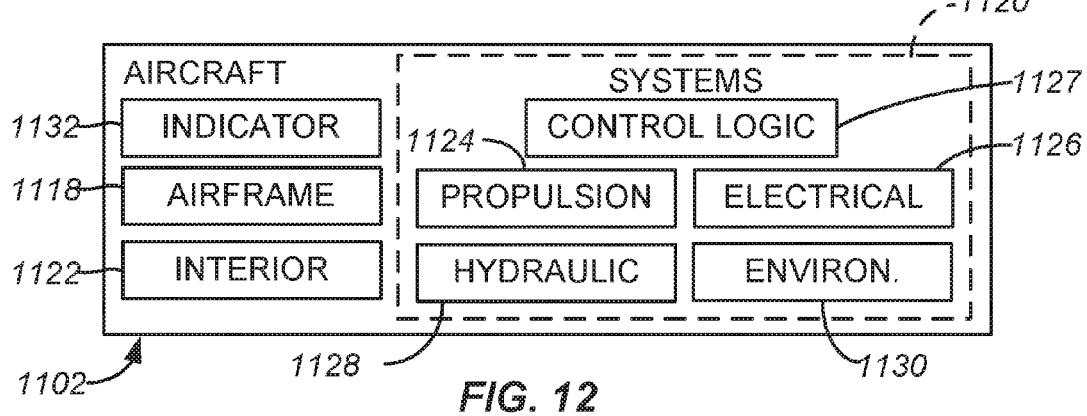
FIG. 12 illustrates a block diagram of an example of an airplane, in accordance with some embodiments.

Accordingly, embodiments of the disclosure may be described in the context of an airplane manufacturing and service method 1100 as shown in FIG. 11 and an airplane 1102 as shown in FIG. 12. During pre-production, illustrative method 1100 may include specification and design 104 of the airplane 1102 and material procurement 1106. During production, component and subassembly manufacturing 1108 and system integration 1110 of the airplane 1102 takes place. Thereafter, the airplane 1102 may go through certification and delivery 1112 in order to be placed in service 1114. While in service by a customer, the airplane 1102 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of airplane manufacturers and major-system subcontractors; a third party may include without limitation any number of venders, subcontractors, and suppliers; and an operator may be an airline, leasing company, military entity, service organization, and so on.

As shown in FIG. 12, the airplane 1102 produced by illustrative method 1100 may include an airframe 1118 with a plurality of systems 1120, control logic 1127, airspeed indicator 1132, and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production process 1108 may be fabricated or manufactured in a manner similar to components or subassemblies produced while the airplane 1102 is in service. Also, one or more apparatus embodiments, method embodiments, or a combination thereof may be utilized during the production stages 1108 and 1110, for example, by substantially expediting assembly of or reducing the cost of an airplane 1102. Similarly, one or more of apparatus embodiments, method embodiments, or a combination thereof may be utilized while the airplane 1102 is in service, for example and without limitation, to maintenance and service 1116.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:
1. An apparatus comprising
   a power generator configured to generate power based on
      one or more aerodynamic forces associated with a vehicle, the power generator being further configured to be deployed from a first portion of the vehicle; and a flow control device configured to generate an increase in airflow associated with the power generator, the increase in airflow enabling, at least in part, the generation of additional power by the power generator, and the flow control device being further configured to be deployed from a second portion of the vehicle.

2. The apparatus of claim 1, wherein the power generator is further configured to be deployed in response to a first event, and the flow control device is configured to be deployed in response to a second event, and wherein the second event comprises a speed of the vehicle being less than a first designated threshold value.

3. The apparatus of claim 1, wherein the flow control device has an input configured to receive an input airflow, and has an output configured to generate an output airflow, wherein a first speed of the input airflow is less than a second speed of the output airflow.

4. The apparatus of claim 3, wherein the power generator comprises:
a loop;
a plurality of resistive devices coupled to the loop, at least one of the plurality of resistive devices being configured to transfer a force to the loop, the force being generated based on an aerodynamic drag associated with the at least one resistive device;
a pulley coupled to the loop and the generator, the pulley being configured to receive the force transferred to the loop, the pulley being further configured to rotate in response to receiving the force from the loop, and the pulley being further configured to transfer the force to the generator; and
a generator coupled to the loop and an electrical system, the generator being further configured to deliver power to the electrical system in response to the loop rotating.

5. The apparatus of claim 4, wherein the flow control device is a nozzle, and wherein the flow control device is configured to provide the output airflow to at least one of the plurality of resistive devices responsive to being in a deployed position.

6. The apparatus of claim 4, wherein each resistive device of the plurality of resistive devices is a pocket coupled to the loop.

7. The apparatus of claim 1, wherein the first event comprises the identifying of a power level associated with the vehicle being less than a second designated threshold value.

8. The apparatus of claim 1, wherein the flow control device and the power generator are configured to be deployed at different times.

9. The apparatus of claim 1, wherein each resistive device of the plurality of resistive devices is a parachute.

10. The apparatus of claim 1, wherein the power generator is located along a centerline of the vehicle, and wherein the vehicle is an airplane.

11. A method comprising:
deploying a power generator in response to identifying a first event, the power generator being deployed from a first portion of a vehicle;
deploying a flow control device in response to identifying a second event, the flow control device being deployed from a second portion of the vehicle; and
increasing, using the flow control device, an airflow associated with the power generator, the increasing of the airflow enabling the generation of additional power by the power generator.

12. The method of claim 11 further comprising:
generating a first amount of power in response to the deploying of the power generator; and
generating a second amount of power in response to the deploying of the flow control device.

13. The method of claim 12, wherein the second amount of power is greater than the first amount of power.

14. The method of claim 11, wherein the first event comprises the identifying of power level associated with the vehicle being less than a second designated threshold value, and wherein the second event comprises a speed of the vehicle being less than a first designated threshold value.

15. The method of claim 11, wherein each resistive device of the plurality of resistive devices is a pocket coupled to a loop.

16. A system comprising:
a power generator configured to be deployed from a first portion of a vehicle in response to a first event, the power generator comprising:
a loop;
a plurality of resistive devices coupled to the loop, at least one of the plurality of resistive devices being configured to transfer a force to the loop, the force being generated based on an aerodynamic drag associated with the at least one resistive device;
a generator coupled to the loop and an electrical system, and the generator being further configured to deliver power to the electrical system in response to the loop rotating; and
a flow control device configured to generate an increase in airflow associated with the power generator, the increase in airflow enabling, at least in part, the generation of additional power by the power generator, and the flow control device being further configured to be deployed from a second portion of the vehicle in response to a second event.

17. The system of claim 16, wherein the second event comprises a speed of the vehicle being less than a first designated threshold value, and wherein the flow control device has an input configured to receive an input airflow, and having an output configured to generate an output airflow, wherein a first speed of the input airflow is less than a second speed of the output airflow.

18. The system of claim 17, wherein the flow control device is a nozzle, and wherein the flow control device is configured to provide the output airflow to at least one of the plurality of resistive devices responsive to being in a deployed position.

19. The system of claim 16, wherein the first event comprises the identifying of a power level associated with the vehicle being less than a second designated threshold value.

20. The system of claim 16, wherein the power generator is located along a centerline of the vehicle, and wherein the vehicle is an airplane.

* * * * *